US012342403B2

(12) United States Patent
Jang et al.

(10) Patent No.: US 12,342,403 B2
(45) Date of Patent: Jun. 24, 2025

(54) MULTI-LINK SETUP IN WIRELESS COMMUNICATION SYSTEM

(71) Applicant: LG Electronics Inc., Seoul (KR)

(72) Inventors: Insun Jang, Seoul (KR); Jeongki Kim, Seoul (KR); Jinsoo Choi, Seoul (KR); Namyeong Kim, Seoul (KR); Taewon Song, Seoul (KR); Sunhee Baek, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/221,599

(22) Filed: Jul. 13, 2023

(65) Prior Publication Data

US 2023/0363030 A1    Nov. 9, 2023

Related U.S. Application Data

(63) Continuation of application No. 18/015,270, filed as application No. PCT/KR2021/008661 on Jul. 7, 2021.

(30) Foreign Application Priority Data

Jul. 10, 2020    (KR) .................. 10-2020-0085501
Jul. 21, 2020    (KR) .................. 10-2020-0090427
(Continued)

(51) Int. Cl.
*H04W 76/15*    (2018.01)
*H04W 84/12*    (2009.01)

(52) U.S. Cl.
CPC ............ *H04W 76/15* (2018.02); *H04W 84/12* (2013.01)

(58) Field of Classification Search
None
See application file for complete search history.

(56) References Cited

U.S. PATENT DOCUMENTS

2014/0105196 A1    4/2014  Seok
2019/0335454 A1*  10/2019  Huang ................... H04W 8/26
(Continued)

FOREIGN PATENT DOCUMENTS

WO    WO 2020/040587 A1    2/2020

OTHER PUBLICATIONS

Cariou et al., "Multi-Link Discovery—part 2," IEEE 02.11-20/0390r3, Intel Corporation, Feb. 13, 2020, 14 pages.
(Continued)

*Primary Examiner* — Faruk Hamza
*Assistant Examiner* — Cassandra L Decker
(74) *Attorney, Agent, or Firm* — Fish & Richardson P.C.

(57) ABSTRACT

In a wireless local area network (WLAN) system, an STA MLD may include a first STA and a second STA, wherein the first STA operates on a first link, and the second STA operates on a second link. The STA MLD may transmit an association request frame to an access point (AP) MLD. The association request frame may include capability information of a requesting STA, which requests to be associated with the AP MLD, among STAs included in the STA MLD and information related to a request link, to with which a request to be associated is transmitted by the requesting STAs. The STA MLD may receive an association response frame from the AP MLD. The association response frame may include capability information of an AP that operates in a link, an association with which is accepted by the AP MLD, among the request links.

15 Claims, 25 Drawing Sheets

(30) Foreign Application Priority Data

Aug. 24, 2020 (KR) .................. 10-2020-0106341
Aug. 24, 2020 (KR) .................. 10-2020-0106389
Jan. 12, 2021 (KR) .................. 10-2021-0004124

(56) References Cited

U.S. PATENT DOCUMENTS

| | | | |
|---|---|---|---|
| 2020/0136884 A1* | 4/2020 | Park | H04L 27/2602 |
| 2020/0137626 A1 | 4/2020 | Huang et al. | |
| 2021/0051574 A1* | 2/2021 | Chu | H04W 84/18 |
| 2021/0076437 A1* | 3/2021 | Kneckt | H04W 76/11 |
| 2021/0143951 A1* | 5/2021 | Chu | H04L 1/1621 |
| 2021/0185154 A1* | 6/2021 | Schelstraete | H04W 28/04 |
| 2021/0227547 A1* | 7/2021 | Chitrakar | H04L 5/0091 |
| 2021/0266931 A1* | 8/2021 | Kwon | H04W 76/11 |
| 2021/0314846 A1* | 10/2021 | Chu | H04W 40/244 |
| 2021/0329500 A1* | 10/2021 | Cariou | H04W 74/002 |
| 2022/0264429 A1* | 8/2022 | Gan | H04W 28/0221 |
| 2022/0330367 A1* | 10/2022 | Inohiza | H04W 8/24 |
| 2023/0013454 A1* | 1/2023 | Gan | H04W 28/02 |
| 2023/0021262 A1* | 1/2023 | Huang | H04W 76/15 |
| 2023/0046270 A1* | 2/2023 | Huang | H04W 28/0268 |
| 2023/0083503 A1* | 3/2023 | Han | H04W 74/0816 370/328 |
| 2023/0103325 A1* | 4/2023 | Li | H04W 24/02 |
| 2023/0156840 A1* | 5/2023 | Chitrakar | H04W 76/14 370/329 |

OTHER PUBLICATIONS

Extended European Search Report in European Appln. No. 21838323.0, mailed on Jun. 12, 2024, 10 pages.

Office Action in Korean Appln. No. 10-2023-7001133, mailed on Apr. 29, 2024, 17 pages (with English translation).

Patil et al., "Container for advertising ML Information," IEEE 802.11-20/0357r8, Qualcomm Inc., Mar. 15, 2020, 32 pages.

* cited by examiner (a)

| L-STF | L-LTF | L-SIG | RL-SIG | U-SIG | EHT-SIG | EHT-STF | EHT-LTF | Data |

FIG. 13

| MLD-level (Common) | STA A | | | | STA B | | | |
|---|---|---|---|---|---|---|---|---|
| Capa. | Capa. | Setup (1) | Operating link Link 1 (+ TID***) or 1000 | ... | Capa. | Setup (1) | Operating link Link 3 (+ TID***) or 0010 | ... | Setup link 1110 (Link 1/2/3) | ... |

Capa.: Capabilities

FIG. 14

| Capa.: Capabilities | | | | | | | |
|---|---|---|---|---|---|---|---|
| MLD-level (Common) | STA A | | | | STA B | | |
| | Capa. | Setup (1) | Operating link: Link 1 (+ TID***) or 1000 | ... | Capa. | Setup (1) | Operating link: Link 3 (+ TID***) or 0010 | ... | Setup link | Setup STA |

| Setup link | Setup STA |
|---|---|
| 1110 (Link 1/2/3) | 11 | ... |

FIG. 15

| MLD-level (Common) | STA A | | STA B | | Setup link | Setup STA | Operating link | |
|---|---|---|---|---|---|---|---|---|
| | Capa. | ... | Capa. | ... | 1110 (Link 1/2/3) | 1i | Link 1 (+TID***) → Link 3 (+TID***) | ⋮ |

Capa.: Capabilities

FIG. 16

Capa.: Capabilities

| MLD-level (Common) | STA B | | | STA C | | |
|---|---|---|---|---|---|---|
| | Capa. | Operating link: Link 1 (ID) (+ TID***) | ... | Capa. | Operating link: 0 (+ TID***) or 0010 | ... |

MULTI-LINK SETUP IN WIRELESS COMMUNICATION SYSTEM

CROSS-REFERENCE TO RELATED APPLICATIONS

This application is a continuation of U.S. application Ser. No. 18/015,270, filed on Jan. 9, 2023, which is a National Stage application under 35 U.S.C. § 371 of International Application No. PCT/KR2021/008661, filed on Jul. 7, 2021, which claims the benefit of Korean Patent Application No. 10-2020-0085501, filed on Jul. 10, 2020, Korean Patent Application No. 10-2020-0090427, filed on Jul. 21, 2020, Korean Patent Application No. 10-2020-0106389, filed on Aug. 24, 2020, Korean Patent Application No. 10-2020-0106341, filed on Aug. 24, 2020, and Korean Patent Application No. 10-2021-0004124, filed on Jan. 12, 2021. The disclosures of the prior applications are incorporated by reference in their entirety.

TECHNICAL FIELD

The present specification relates to a multi-link setup method in a wireless local area network system.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

In a wireless local area network (WLAN) system according to various embodiments, a station (STA) multi-link device (MLD) may include a first STA and a second STA. The first STA may operate in a first link. The second STA may operate in a second link. The STA MLD may transmit an association request frame to an access point (AP) MLD. The association request frame may include capability information of a requesting STA which requests for an association with the AP MLD among STAs included in the STA MLD and information related to a request link for which the requesting STAs request for the association. The STA MLD may receive an association response frame from the AP MLD. The association response frame may include capability information of an AP operating in a link for which the AP MLD accepts the association among the request links.

According to an example of the present specification, an AP MLD may transmit only complete information on APs corresponding to a link for which setup is accepted among links for which setup is requested. Due to a great size of the complete information, overhead is excessively great when the complete information on all STA and APs included in an MLD is transmitted. Therefore, according to an embodiment of the present specification, the overhead may be decreased by transmitting only information on a request link required in setup and a link for which a request is accepted.

BRIEF DESCRIPTION OF THE DRAWINGS

FIG. 5 illustrates an example of a PPDU used in the present specification.

FIG. 13 illustrates an embodiment of the method A-1.

FIG. 14 illustrates an embodiment of the method A-2.

FIG. 15 illustrates an embodiment of the method A-3.

FIG. 16 illustrates an embodiment of the method A-4.

DETAILED DESCRIPTION

Figure 1:
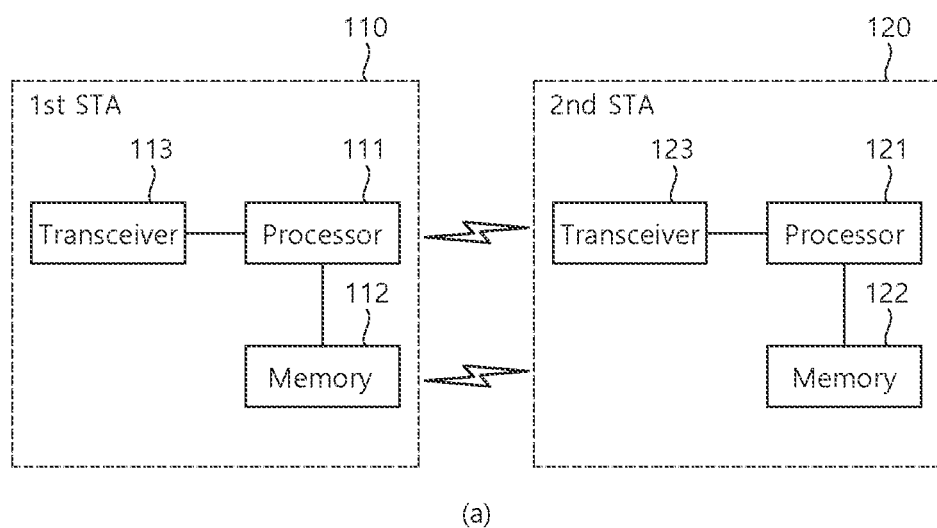
FIG. 1 shows an example of a transmitting apparatus and/or receiving apparatus of the present specification.
Figure 1:
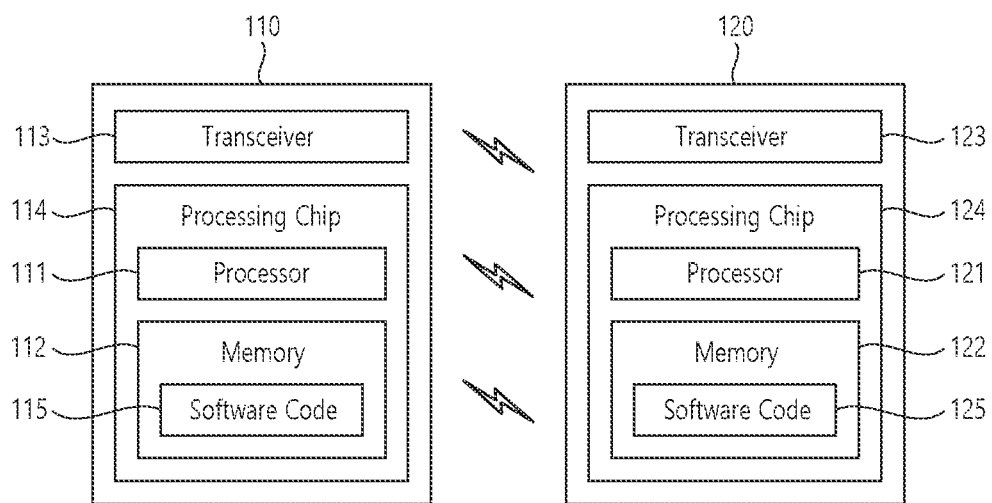

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP. In the present specification, the AP may be indicated as an AP STA.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, an STA1, an STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an AP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
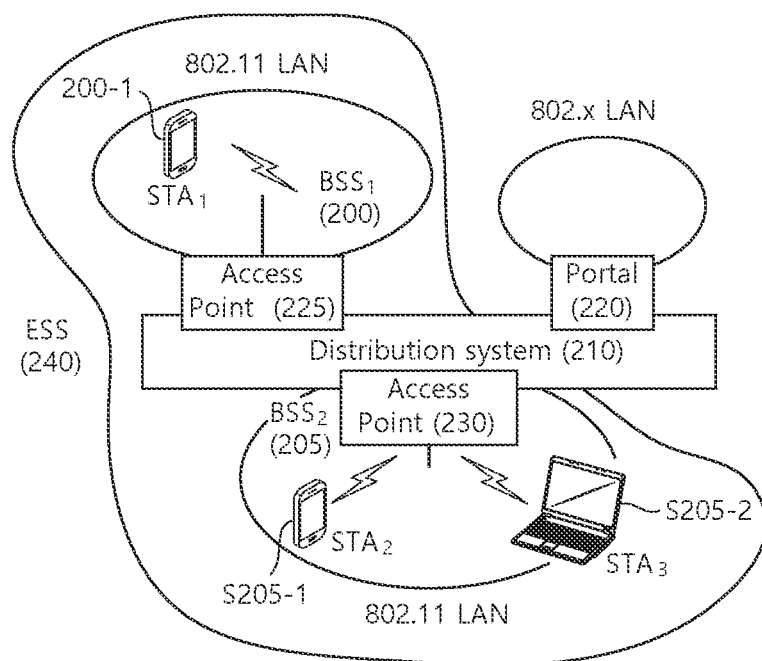
FIG. 2 is a conceptual view illustrating the structure of a wireless local area network (WLAN).
Figure 2:
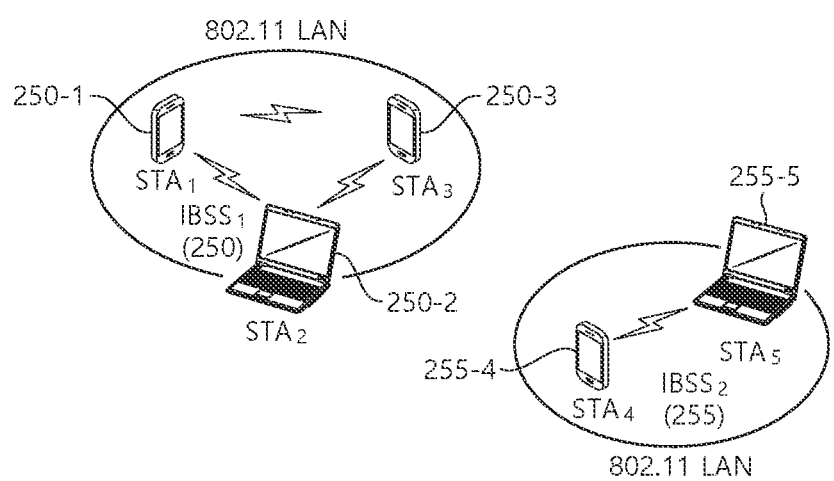

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and an STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
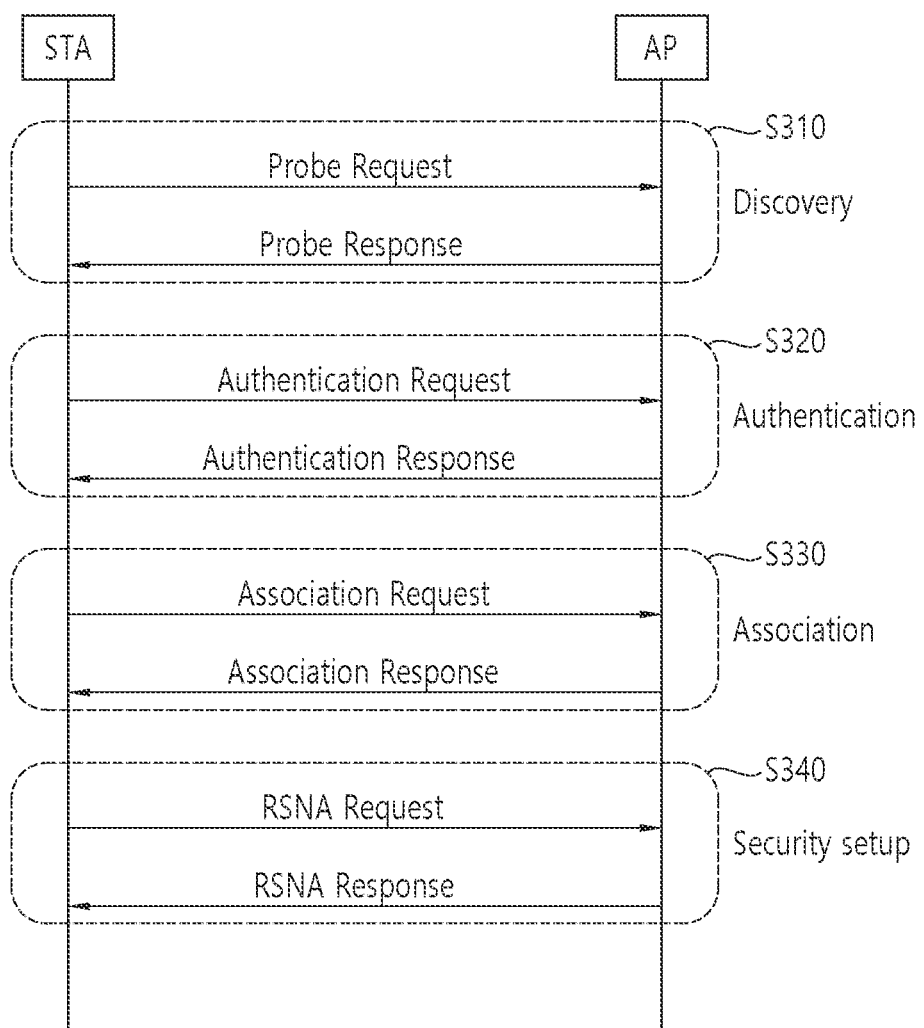
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
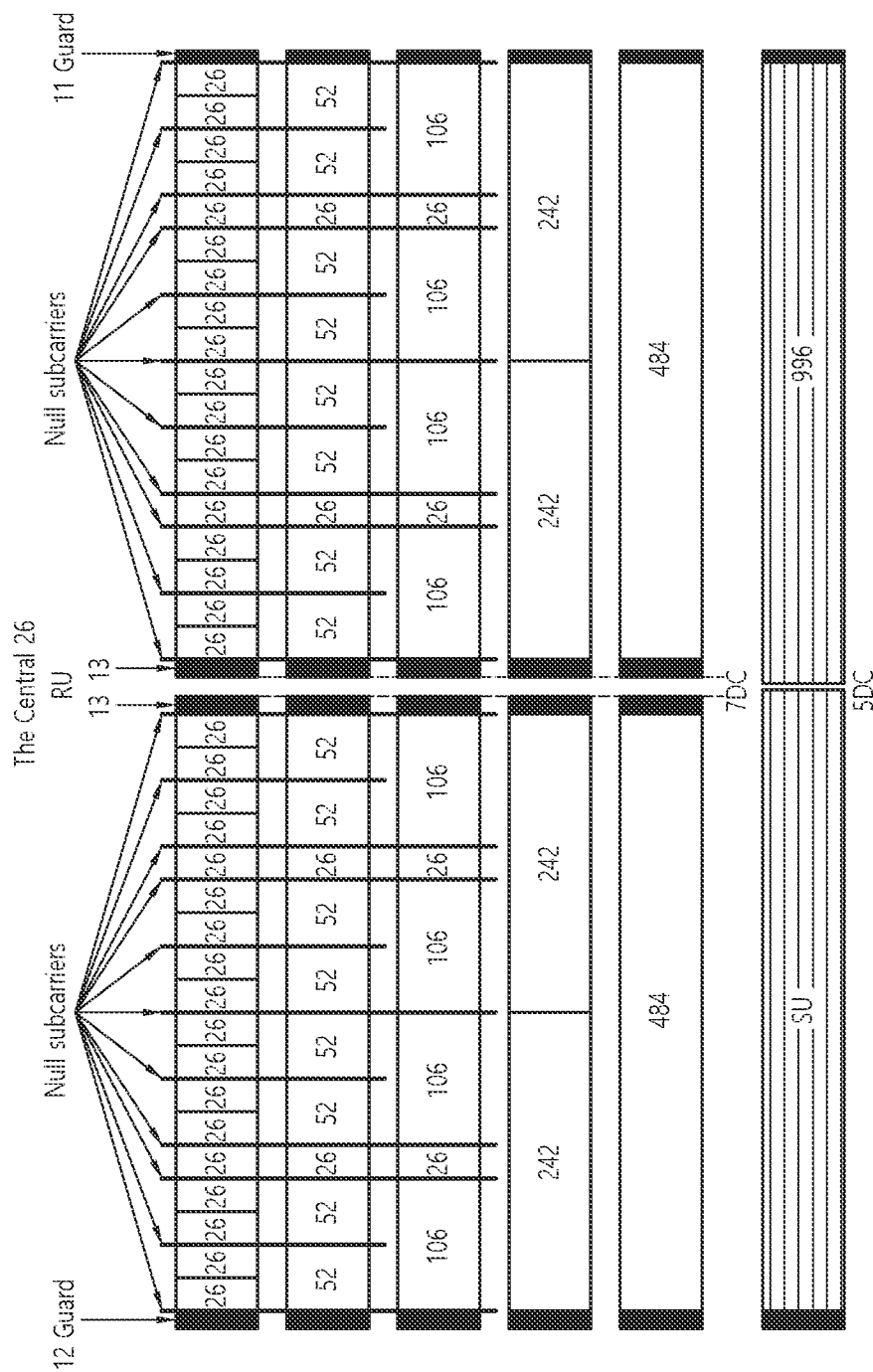
FIG. 4 illustrates a layout of resource units (RUs) used in a band of 80 MHz.

FIG. 4 illustrates a layout of resource units (RUs) used in a band of 80 MHz.

RUs having various sizes such as a 26-RU, a 52-RU, a 106-RU, a 242-RU, a 484-RU, a 996-RU may be used. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

Figure 7:
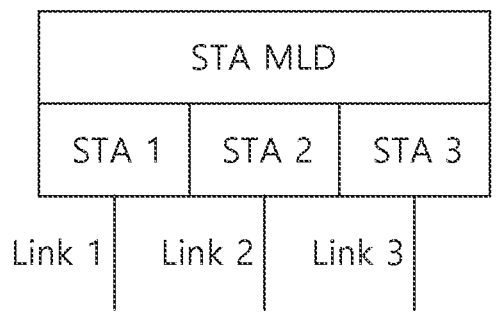
FIG. 7 illustrates an example of a station (STA) multi-link device (MLD).

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Hereinafter, a PPDU transmitted/received in a STA of the present specification will be described.

FIG. 5 illustrates an example of a PPDU used in the present specification.

The PPDU of FIG. 5 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 5 may indicate the entirety or part of a PPDU type used in the EHT system. For example, the example of FIG. 5 may be used for both of a single-user (SU) mode and a multi-user (MU) mode. In other words, the PPDU of FIG. 5 may be a PPDU for one receiving STA or a plurality of receiving STAs. When the PPDU of FIG. 5 is used for a trigger-based (TB) mode, the EHT-SIG of FIG. 5 may be omitted. In other words, a STA which has received a trigger frame for uplink-MU (UL-MU) may transmit the PPDU in which the EHT-SIG is omitted in the example of FIG. 5.

In FIG. 5, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 5 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 5, the L-LTF and the L-STF may be the same as those in the conventional fields.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 5. The U-SIG may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

The common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 6, each user field may be related to MU-MIMO allocation, or may be related to non-MU-MIMO allocation.

The common field of the EHT-SIG may include a CRC bit and a tail bit. A length of the CRC bit may be determined as 4 bits. A length of the tail bit may be determined as 6 bits, and may be set to '000000'.

The common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits).

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 5. The PPDU of FIG. 5 may be used to transmit/receive frames of various types. For example, the PPDU of FIG. 5 may be used for a control frame. An example of the control frame may include a request to send (RTS), a clear-to-send (CTS), a power save-poll (PS-poll), BlockACKReq, BlockAck, a null data packet (NDP) announcement, and a trigger frame. For example, the PPDU of FIG. 5 may be used for a management frame. An example of the management frame may include a beacon frame, a (re-)association request frame, a (re-)association response frame, a probe request frame, and a probe response frame. For example, the PPDU of FIG. 5 may be used for a data frame. For example, the PPDU of FIG. 5 may be used to simultaneously transmit at least two or more of the control frame, the management frame, and the data frame.

Figure 6:
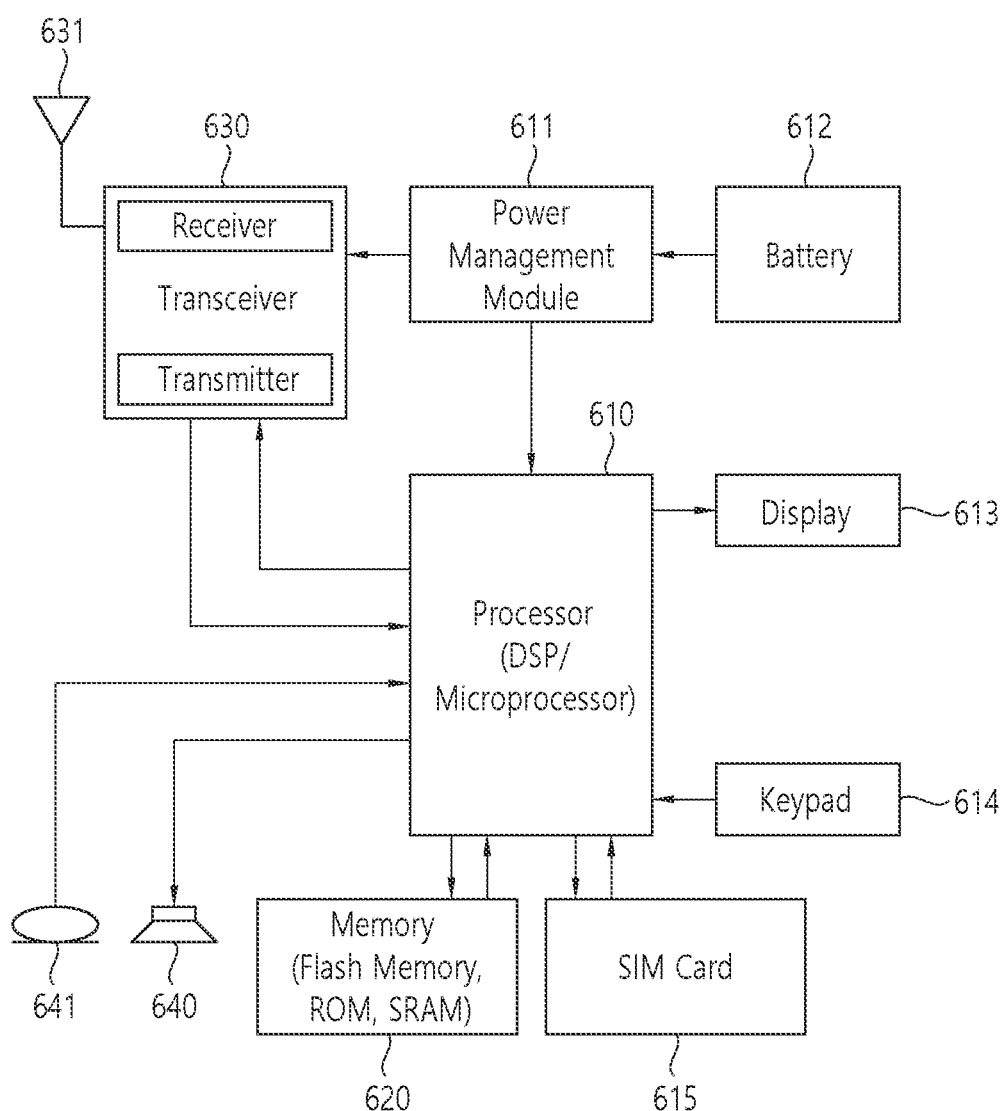
FIG. 6 illustrates an example of a modified transmission device and/or receiving device of the present specification.

FIG. 6 illustrates an example of a modified transmission device and/or receiving device of the present specification.

Each device/STA of the sub-figure (a)/(b) of FIG. 1 may be modified as shown in FIG. 6. A transceiver 630 of FIG. 6 may be identical to the transceivers 113 and 123 of FIG. 1. The transceiver 630 of FIG. 6 may include a receiver and a transmitter.

A processor 610 of FIG. 6 may be identical to the processors 111 and 121 of FIG. 1. Alternatively, the processor 610 of FIG. 6 may be identical to the processing chips 114 and 124 of FIG. 1.

A memory 620 of FIG. 6 may be identical to the memories 112 and 122 of FIG. 1. Alternatively, the memory 620 of FIG. 6 may be a separate external memory different from the memories 112 and 122 of FIG. 1.

Referring to FIG. 6, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 6, a speaker 640 may output a result related to a sound processed by the processor 610. A microphone 641 may receive an input related to a sound to be used by the processor 610.

Hereinafter, technical features for multi-link (ML) supported by the STA of the present specification will be described.

A STA (AP and/or non-AP STA) of the present specification may support ML communication. ML communication may mean communication supporting a plurality of links. Links related to ML communication may include at least one channel of a 2.4 GHz band, a 5 GHz band, and a 6 GHz band (e.g. 20/40/80/160/240/320 MHz channels).

A plurality of links used for ML communication may be configured in various ways. For example, a plurality of links supported by one STA for ML communication may include a plurality of channels in a 2.4 GHz band, a plurality of channels in a 5 GHz band, and/or a plurality of channels in a 6 GHz band. Alternatively, a plurality of links supported by one STA for ML communication includes a combination of at least one channel in the 2.4 GHz band (or 5 GHz/6 GHz band) and at least one channel in the 5 GHz band (or 2.4 GHz/6 GHz band). Meanwhile, at least one of a plurality of links supported by one STA for ML communication may be a channel to which preamble puncturing is applied.

A STA may perform ML setup to perform ML communication. ML setup may be performed based on a management frame such as Beacon, Probe Request/Response, Association Request/Response or a control frame. For example, information related to ML configuration may be included in an element field included in Beacon, Probe Request/Response, and Association Request/Response.

When ML setup is completed, an enabled link for ML communication may be determined. The STA may perform frame exchange through at least one of a plurality of links determined as an enabled link. For example, the enabled link may be used for at least one of a management frame, a control frame and a data frame.

When one STA supports a plurality of links, a transceiver supporting each link may operate as one logical STA. For example, one STA supporting two links may be expressed as one multi-link device (MLD) including a first STA for a first link and a second STA for a second link. For example, one AP supporting two links may be expressed as one AP MLD including a first AP for a first link and a second AP for a second link. In addition, one non-AP supporting two links may be expressed as one non-AP MLD including a first STA for the first link and a second STA for the second link.

Hereinafter, more specific features related to ML setup are described.

The MLD (AP MLD and/or non-AP MLD) may transmit information related to a link that the corresponding MLD can support through ML setup. Link information may be configured in various ways. For example, information about the link includes at least one of 1) information on whether the MLD (or STA) supports simultaneous RX/TX operation, 2) information about the number/upper limit of uplink/downlink links supported by the MLD (or STA), 3) information about the location/band/resource of the uplink/downlink link supported by the MLD (or STA), 4) information about the type (management, control, data etc.) of frame available or preferred in at least one uplink/downlink link, 5) information about available or preferred ACK policy in at least one uplink/downlink link, and/or 6) information about available or preferred TID (traffic identifier) in at least one uplink/downlink link. The TID is related to the priority of traffic data and is expressed as eight types of values according to the conventional WLAN standard. That is, eight TID values corresponding to four access categories (ACs) (AC_BK (background), AC_BE (best effort), AC_VI (video), and AC_VO (voice)) according to the conventional WLAN standard can be defined.

For example, it may be configured in advance that all TIDs for uplink/downlink link are mapped. Specifically, if negotiation is not made through ML setup, all TIDs are used for ML communication. If mapping between uplink/downlink link and TID is negotiated through additional ML setup, the negotiated TID is used for ML communication.

A plurality of links that can be used by the transmitting MLD and the receiving MLD related to ML communication may be configured through ML setup, and this may be referred to as an "enabled link". The "enabled link" may be called differently in various expressions. For example, it may be referred to as various expressions such as a first link, a second link, a transmission link, and a reception link.

After the ML setup is completed, the MLD may update the ML setup. For example, the MLD may transmit information about a new link when it is necessary to update information about the link. Information related to the new link may be transmitted based on at least one of a management frame, a control frame, and a data frame.

According to an embodiment, the MLD may include a non-AP MLD and an AP-MLD. The non-AP MLD and the AP-MLD may be classified according to the function of an access point (AP). The non-AP MLD and the AP-MLD may be physically separated or logically separated. For example, when the MLD performs an AP function, it may be referred to as an AP MLD, and when the MLD performs a STA function, it may be referred to as a non-AP MLD.

In the following specification, the MLD has one or more connected/associated STAs and has one MAC service access point (SAP) through an upper link layer (Logical Link Control, LLC). The MLD may mean a physical device or a logical device. Hereinafter, a device may mean the MLD.

In addition, the MLD may include at least one STA connected to each link of the multi-link. For example, the processor of the MLD may control the at least one STA. For example, the at least one STA may be independently configured and operated. The at least one STA may include a processor and a transceiver, respectively. For example, the at least one STA may operate independently regardless of the processor of the MLD.

In the following specification, for the convenience of description, it is described that the MLD (or the processor of the MLD) controls at least one STA, but is not limited thereto. As described above, the at least one STA may transmit/receive a signal independently regardless of the MLD.

According to an embodiment, the AP MLD or the non-AP MLD may be configured in a structure having a plurality of links. In other words, the non-AP MLD may support a plurality of links. The non-AP MLD may include a plurality of STAs. Each of a plurality of STAs may have a link for a corresponding STA.

The 802.11be standard (hereinafter, the EHT standard) may support a multi-link. Here, the multi-link may include multiple bands. That is, the multi-link may mean links included in several frequency bands, or may mean a plurality of links included in one frequency band.

The EHT standard may support Simultaneous TX/RX (STR) Channel access according to Link capability in a multi-link support environment. A device supporting a multi-link may be defined as a Non-AP/AP Multi-Link Device (MLD). STR Capability may mean that data (or signals) can be transmitted/received simultaneously in multiple links. That is, an MLD supporting STR capability (hereinafter, STR MLD) may receive data through one link when data transmission occurs on another link.

On the other hand, MLDs that do not support STR capability (hereinafter, non-STR MLDs) cannot simultaneously transmit and receive data (or signals) because data collision may occur due to interference. For example, when a non-STR MLD receives data (or a signal) from one link, it does not attempt transmission to another link to avoid interference. If data (or signal) transmission and reception occur simultaneously in both links, data (or signal) collision may occur.

In other words, the STR MLD may simultaneously perform signal transmission and signal reception in a multi-link, respectively. Non-STR MLD cannot simultaneously transmit and receive signals in a multi-link. While transmitting a signal in the first link among a multi-link, a STA that does not support the STR operation cannot receive a signal in a link different from the first link, but could transmit a signal. In addition, while receiving a signal in the first link among the multi-link, a STA that does not support the STR operation cannot transmit a signal in a link different from the first link, but could receive a signal.

EHT (11be) may consider a multi-link technology. Herein, a multi-link may include multiple bands. That is, the multi-link may represent links of several bands and at the same time may represent several multi-links within one band. Two types of multi-link operations are considered. A capability which enables simultaneous reception and transmission in several links is called simultaneous transmit and receive (STR). It may be said that links having the STR capability are in an STR relation, and links not having the STR capability are in a non-STR relation.

FIG. 7 illustrates an example of an STA MLD.

Referring to FIG. 7, the STA MLD may have a plurality of links (e.g., three links). ML setup between MLDs through one link is defined in 11be. Therefore, one STA may provide information (e.g., capability) on one or more links of the STA for single ML setup. The present specification proposes a process for the ML setup and a method of indicating information for this.

In the present specification, an STA (or an STA MLD) may mean an AP (or an AP MLD) or a non-AP (or a non-AP MLD).

First, a link setup type between the AP MLD and the non-AP MLD is defined.

Set of Supported links: links supported by the STA MLD

Figure 8:
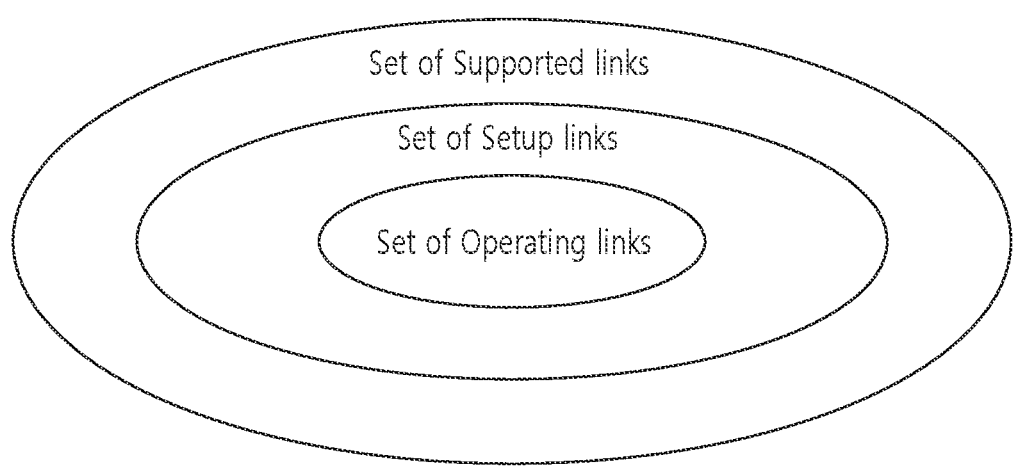
FIG. 8 illustrates an embodiment of each link setup relationship.

Set of Setup links: links for which the AP MLD and the non-AP MLD perform ML setup Set of Operating links: links for which the non-AP MLD and the AP MLD operate in practice, that is, exchange frames FIG. 8 illustrates an embodiment of each link setup relationship.

Referring to FIG. 8, Set of Supported links may include Set of Setup links, and the Set of Setup links may include Set of Operating links. Alternatively, the Set of Setup links may be identical to the Set of Operating links. That is, all setup links may be operating links. That is, the setup link and the operating link may not be distinguished.

Figure 9:
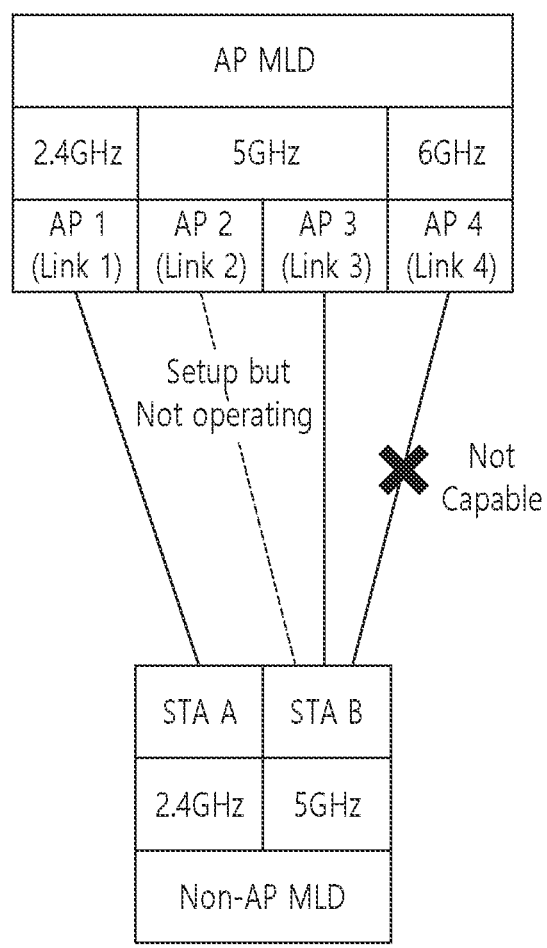
FIG. 9 illustrates an embodiment of a link set relationship.

FIG. 9 illustrates an embodiment of a link set relationship.

Referring to FIG. 9, an AP MLD may include an AP1 to an AP4, and a non-AP MLD may include an STA A and an STA B. In this example, Set of Supported links supported by the AP MLD corresponds to links 1, 2, 3, and 4. However, STAs of the non-AP MLD do not support 6 GHz, and thus are not set up with the AP4. Therefore, the Set of Setup links corresponds to links 1, 2, and 3. Although the setup is achieved with three links, since the non-AP MLD is capable of using two links, the Set of operating links operating in practice may correspond to links 1 and 3.

Alternatively, one STA may perform link setup only with one AP, and a setup link may be identical to an operating link. That is, the STA A may operate by being set up with the AP1, and the STA B may operate by being set up with the AP3 (or AP2).

That is, if the AP and the STA are aggregated only in pair to set up one link, i.e., if the AP and the STA are mapped in a 1:1 manner, the AP2 (link 2) may be excluded in the setup in this example.

Figure 10:
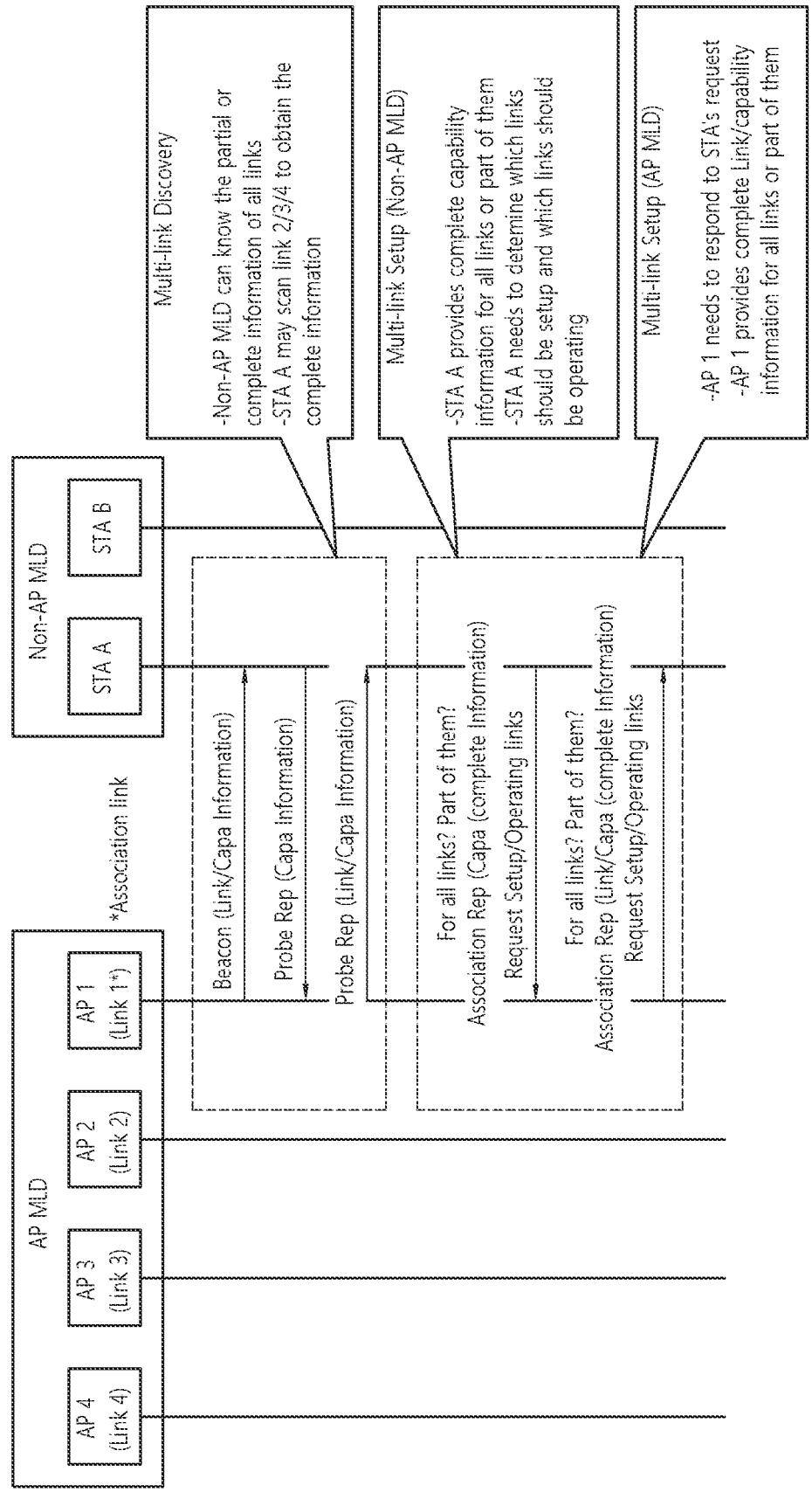
FIG. 10 illustrates an example of an overall process of multi-link discovery and setup.

FIG. 10 illustrates an example of an overall process of multi-link discovery and setup.

Referring to FIG. 10, partial information may mean information which is partial, that is, for example, information (e.g., reduced neighbor report (RNR) element) which shall be known at least, such as a channel and a channel basic service set identifier (BSSID). Complete information may mean information which is complete, that is, the entire information such as all capabilities, operational parameters, or the like, as in the conventional case. In addition, an association link may mean a link for which ML setup is performed.

In the multi-link discovery operation, the non-AP MLD may know (partial or complete) information on each AP of the AP MLD. In other words, if the link 1 of the AP1 is a link (e.g., an association link) in which ML setup is performed, complete information of the AP1 may be known as in the conventional case, and partial information or complete information may be known for the AP2, AP3, and AP4.

The non-AP MLD may perform ML setup with the AP MLD, based on the partial information and/or the complete information. If the conventional association request/response frame is used, in the association request, the non-AP MLD requests for a setup link and an operating link, and the AP MLD responds to this.

When one STA of the non-AP MLD requests for the ML setup, there is a need to report information on another STA. If there is an MLD-level, that is, information which exists commonly for all STAs, this may be included, and if not, this may not be included. A method of indicating information on each STA may include the following methods.

1) Provide Information on All STAs Included in the Non-AP MLD

Information on all STAs may be provided regardless of setup and operation links. That is, when a first STA included in the non-AP MLD performs setup, information on all other STAs included in the non-AP MLD may be provided. This may provide flexibility from a perspective of the ML setup when the AP MLD determines an STA suitable for the ML setup. In addition, since an STA not to be set up may have a possibility of being set up at a later time, it may be helpful for the AP MLD to provide corresponding STA information. However, signaling overhead may be increased compared to other methods.

2) Provide Information on STAs to Be Set Up

Information on all STAs to be set up may be provided regardless of an operating link. Similarly to the method 1), this may provide flexibility from a perspective of the ML setup when the AP MLD determines an STA suitable for the ML setup.

3) Provide Information on STAs to Be Operated in Practice

If information on STAs which have the smallest signaling overhead but do not operate in practice is not provided, it may be difficult to perform an operation such as link switching or the like at a later time.

Figure 11:
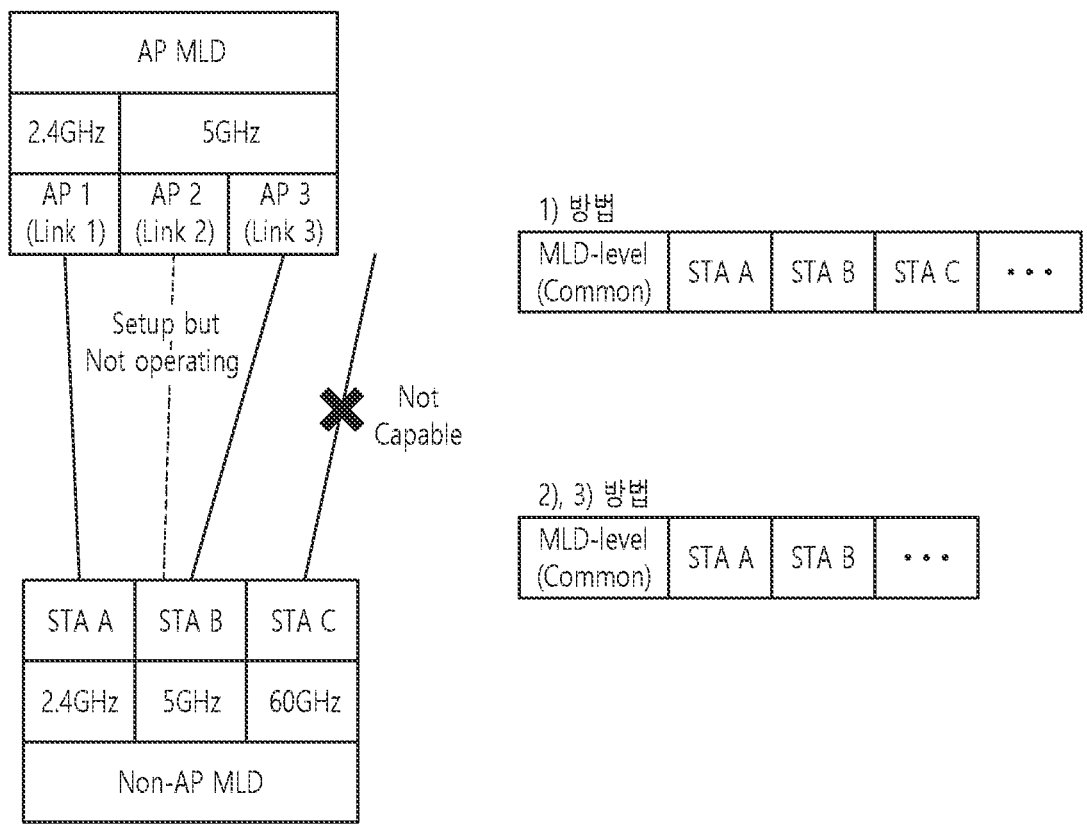
FIG. 11 illustrates an embodiment of a method of providing information of STAs included in an MLD.

FIG. 11 illustrates an embodiment of a method of providing information of STAs included in an MLD.

Referring to FIG. 11, it is difficult for an STA C to be set up with an AP MLD. However, a non-AP MLD may also provide information on the STA C when the method 1) is used. Accordingly, the information on the STA C is not provided in the methods 2) and 3).

That is, according to the method 1), information related to the STA A, STA B, and STA C may be provided to the AP MLD, and according to the methods 2) and 3), information related to the STA A and STA B may be provided to the AP MLD. In this example, the same information may be provided since an operating STA is identical to a setup STA.

In addition to the providing of the information on the STA, the non-AP MLD may request for certain APs with which respective STAs desire to be set up and certain APs with which the respective STAs desire to operate in practice. For example, although the STA B is set up with the AP2 and the AP3 in FIG. 11, an operation may be performed in practice in a link 3 of the AP3. Accordingly, a method of indicating this is required. In particular, this request may be considered together with the aforementioned indication method for each STA.

In the following example, an association link is a link 1, and it is described by focusing on a setup STA. When a request is made by the STA A, information on the STA A may be included in an EHT capabilities element or the like as in the conventional case, and only information on other STAs except for the STA A may be included in a multi-link element.

A. Provide Information on all STAs Included in the Non-AP MLD, and Indicate the Setup STA and the Operating Link FIG. 12 illustrates an embodiment of the method A.

Figure 12:
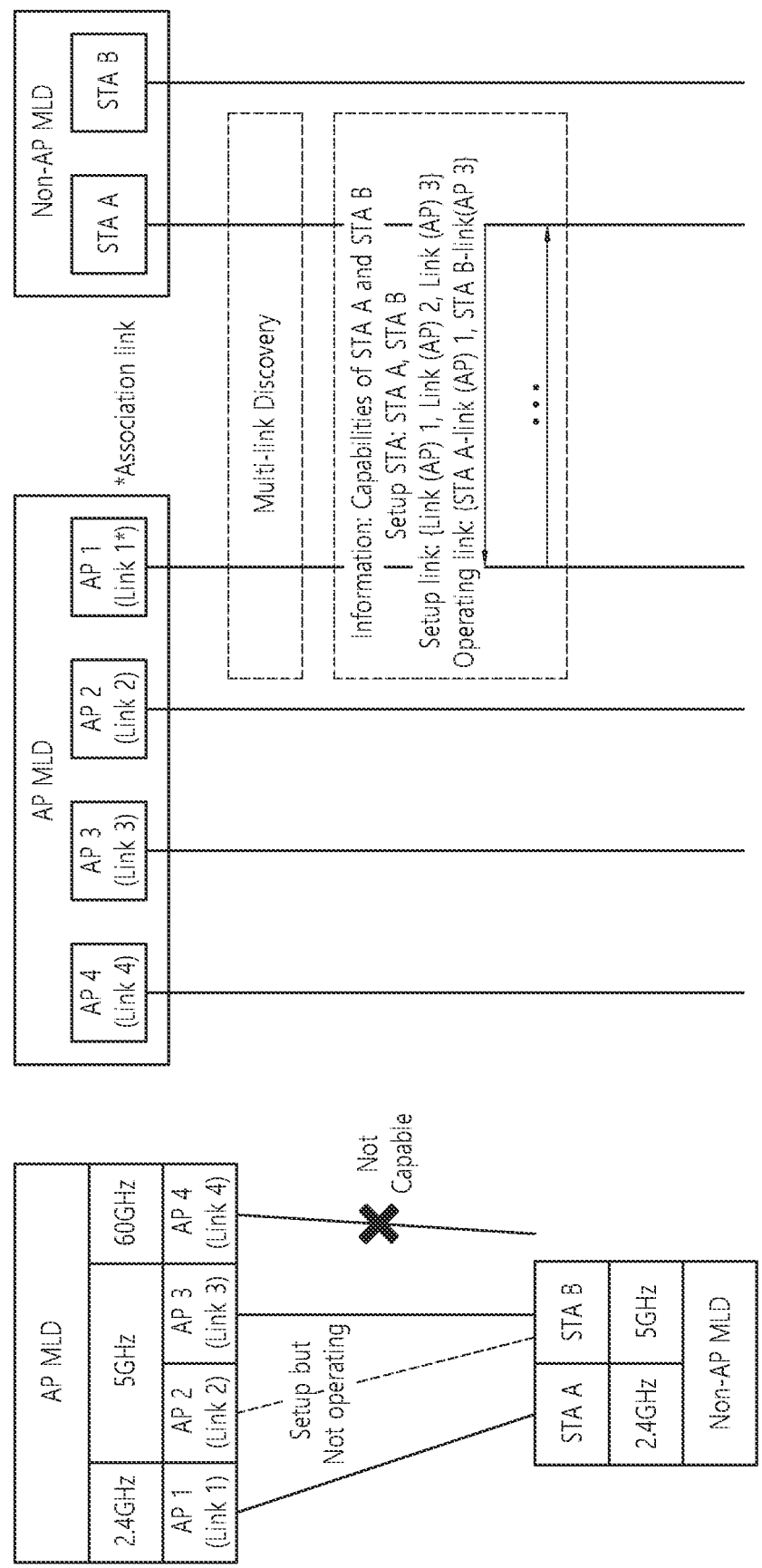
FIG. 12 illustrates an embodiment of the method A.

Referring to FIG. 12, information transmitted by an STA A of a non-AP MLD includes the entire information (i.e., complete information) of the STA A and STA B belonging to the non-AP MLD, and may indicate the STA A and the STA B as an STA to be set up. In addition, the STA A may request for {Link 1, Link 2, Link 3} as a setup link, except for a link 4 which is not capable, and for an operating link, may request the STA A to operate with the link 1 and the STA B to operate with the link 3.

Examples of a method of indicating information of the method A are as follows, and are not limited thereto.

A-1) Indicate Whether to Set Up and with which Link It will Operate in Information of Each STA. In Addition, Indicate a Setup Link Separately For example, whether to be set up may be indicated with 1bit, and an operating link may be indicated with a bitmap or a link identifier (ID) capable of identifying a link. In addition, a TID to be mapped together with the link ID may be indicated for the operating link. Alternatively, the AP MLD may request the non-AP MLD for information related to a specific link with which it will be set up/operate. In addition, a setup link may also be indicated by enumerating the link ID or may be indicated with a bitmap. When a setup link is identical to an operating link, only the setup link may be indicated by enumerating the link ID or may be indicated with the bitmap.

The setup link may be separately indicated, but this is not mandatory. That is, the setup link may be indicated in information of each STA. However, this method may have higher overhead than a method of indicating the information separately.

FIG. 13 illustrates an embodiment of the method A-1.

Referring to FIG. 13, the information to be transmitted by the STA A of the non-AP MLD in FIG. 12 may include information configured as shown in FIG. 13. In case of a link bitmap, it is assumed that links from an AP are indicated in the order of links 1, 2, 3, and 4. An STA A is a setup STA with Setup=1, and an operating link may include a bitmap 1000 indicating an ID (and a to-be-mapped TID) of the link 1 or indicating the link 1. Likewise, an STA B is a setup STA with Setup=1, and an operating link may include a bitmap 0010 indicating an ID (and a to-be-mapped TID) of the link 3 or indicating the link 3.

A bitmap 1110 is used to indicate the links 1, 2, and 3 as the setup link. That is, a setup link field may include a bitmap of 1110.

A-2) The Setup STA or the Operating Link in A-1 is Indicated Separately

For example, the setup STA may be indicated with a bitmap corresponding to the number of STAs, and an operating link may indicate a link ID according to the order of STAs (e.g., STA A→STA B of FIG. 14) in which information is indicated. In addition, a setup link may also be indicated by enumerating the link ID or may be indicated with a bitmap.

FIG. 14 illustrates an embodiment of the method A-2.

Referring to FIG. 14, an example of the indication method A-2 related to FIG. 12 is shown in FIG. 14. In case of a link bitmap, it is assumed that links from an AP are indicated by default in the order of links 1, 2, 3, and 4. An operating link of an STA A indicates a bitmap 1000 indicating an ID (and a to-be-mapped TID) of the link 1 or indicating the link 1. That is, an operating link field of the STA A may include the ID of the link 1, the to-be-mapped TID, and/or the bitmap 1000. Likewise, an operating link of an STA B indicates a bitmap 0010 indicating an ID (and a to-be-mapped TID) of the link 3 or indicating the link 3. That is, an operating link field of the STA B may include the ID of the link 3, the to-be-mapped ID, and/or the bitmap 0010. In this example, a bitmap 1110 is used to indicate the links 1, 2, and 3 as the setup link. In addition, setup STA information (i.e., setup STA field) may include information which requests both the STA A and the STA B for setup by using a 2-bit bitmap of 11 according to the order of STAs (e.g., STA A and STA B) in which information is indicated as an STA to be set up, i.e., STA A→STA B.

A-3) Both the Setup STA and the Operating Link in A-1 are Separately Indicated

For example, the setup STA field may include a bitmap corresponding to the number of STAs, and an operating link may indicate a link ID according to the order of STAs (e.g., STA A→STA B of FIG. 14) in which information is indicated. In addition, a setup link may also be indicated by enumerating the link ID or may be indicated with a bitmap.

FIG. 15 illustrates an embodiment of the method A-3.

Referring to FIG. 15, an example of the indication method A-3) related to FIG. 12 is shown in FIG. 15. In case of a link bitmap, it is assumed that links from an AP are indicated by default in the order of links 1, 2, 3, and 4. In this example, a bitmap 1110 is used to indicate the links 1, 2, and 3 as the setup link. In addition, setup STA information (i.e., setup STA field) may include information which requests both the STA A and the STA B for setup by using a 2-bit bitmap of 11 according to the order of STAs in which information is indicated as an STA to be set up, i.e., STA A→STA B. In addition, for the operating link, the link ID is used in the order of STA information indication so that the STA A requests for the link 1 and the STA B requests for the link 3 as the operating link. In addition, information related to a TID to be mapped for each link may also be included.

A-4) An Operating Link is Indicated in Information of Each STA in A-1 to Indicate the Operating at the Same Time of the Setup, and Another Value (e.g., 0) is Set in an STA which will not Request for the Setup/Operating FIG. 16 illustrates an embodiment of the method A-4.

Referring to FIG. 16, it is assumed that an STA C exists additionally as shown in FIG. 11. An STA A is an STA which requests for setup, and information transmitted by the STA A may include information on an STA B and STA C. When an STA and AP performing link setup are 1:1 mapped, an operating link may be identical to a setup link. Therefore, a field related to the STA B includes an ID of a link 1 and requests for operating while being set up with the link 1, and a field related to the STA C sets 0 in an operating link as a link ID since the STA C is an STA which does not want to be set up. Any other values may be set other than 0. For example, the link ID of the STA C which does not want to be set up may be set to a link ID of an association link (e.g., a link ID of an AP 1 of FIG. 12).

B. Provide Information on STAs to Be Set Up. Consider These STAs as Requesting Setup STAs and Indicate an Operating Link (e.g., Link ID)

This method is the same as the method A (for example, including the methods A-1, A-2, and A-3) except for whether a setup STA is included. Merely, in some cases in the method A, a specific STA may not transmit a request to an STA to be set up. However, in the method B, it is not necessary to indicate information on the setup STA since only information of STAs which will transmit a request for the setup is included.

Figure 17:
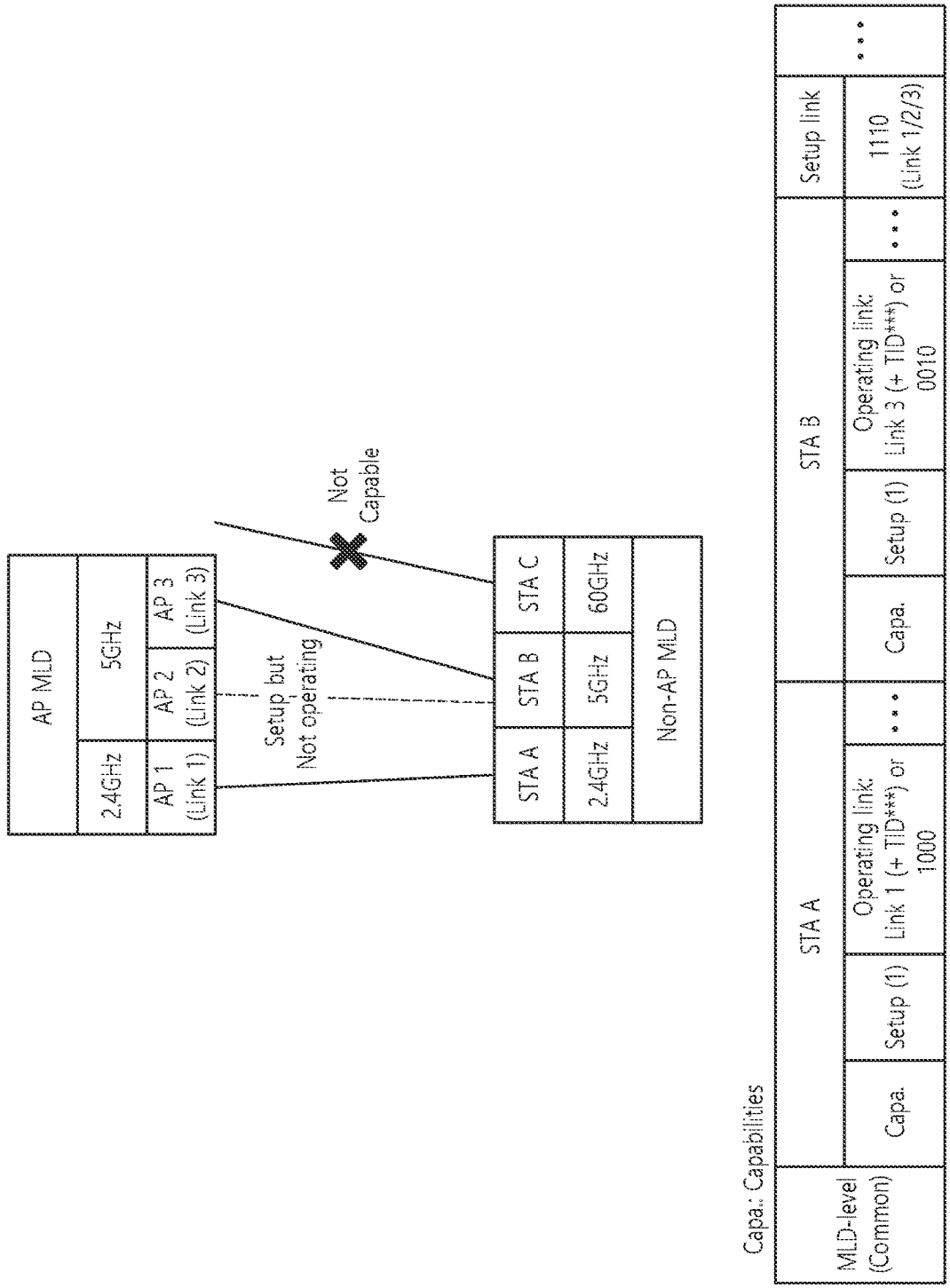
FIG. 17 illustrates an embodiment of the method B.

FIG. 17 illustrates an embodiment of the method B.

Referring to FIG. 17, the method B is almost similar to the method A. However, since a STA C is not an STA which requests for setup, it is excluded in information, and only information on an STA A and STA B is included. In addition, since the STA A and the STA B are already the setup requesting STAs, whether to be set up is not included.

The method B may be considered if all STAs shall be set up always regardless of capability.

A setup link may not be necessarily indicated if all links shall be set up always regardless of capability of an STA/AP.

Meanwhile, since the AP MLD may not know the presence of the STA C, when the method B is used, the non-AP MLD may report information such as 'number of STAs' or the like, which is the total number of STAs, to the AP MLD through an association request frame in order to report the presence of the STA C. Through this information, the AP MLD may request for information by considering an STA which is not set up for operating such as switching or the like at a later time.

The information indication method is proposed above when one STA of the non-AP MLD requests for ML setup. Next, an information indication method is proposed when one AP of the AP MLD responds to the ML setup request.

By default, the AP MLD may respond to the ML setup request as Accept, Reject, or by modifying part of the request.

1. In Case of Accept

If the AP MLD accepts the ML setup requested by the non-AP MLD, setup/operating link-related information requested by the non-AP MLD shall be accepted, and a response shall be made according to this.

By default, when responding to the ML setup, the AP MLD may provide complete information (e.g., all capabilities, related parameter information) for each link, and indication information on a setup link and/or operating link may be included. A method for this may include the following method.

1-1. When Only Complete Information on Setup Links (APs) is Included

A link/AP including complete information is eventually a setup link (AP). In addition, since an AP MLD has accepted, an operating link may also be configured as requested by a non-AP MLD.

Figure 18:
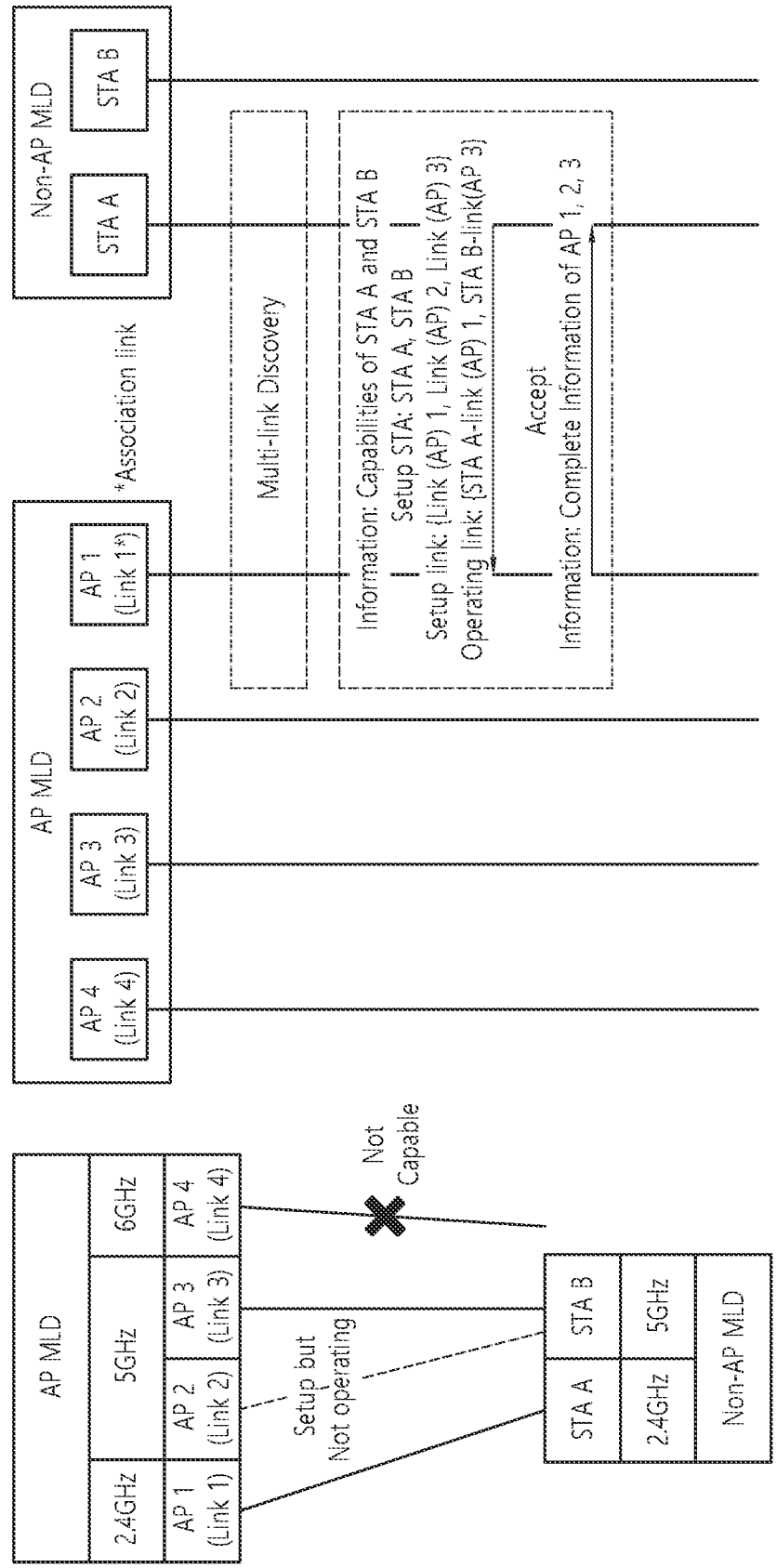
FIG. 18 illustrates an embodiment of the method 1-1.

FIG. 18 illustrates an embodiment of the method 1-1.

Referring to FIG. 18, an AP MLD may accept a requested link, and an accept signal may include complete information on APs (links) 1, 2, and 3 which are setup APs (links). If the AP and the STA are aggregated only in pair to set up one link, i.e., if the AP and the STA are mapped in a 1:1 manner, the AP2 may be excluded in the setup in this example. That is, information of the AP2 may be excluded. For example, the non-AP MLD may transmit to the AP-MLD an association request frame which requests for setup of the link 1 and link 3, and the AP MLD may transmit an association response frame which accepts the setup of the link 1 and link 3. The association response frame may include complete information of the AP1 and AP3 operating in the link 1 and link 3.

2. When Complete Information on All Links (APs) is Included

Since an AP MLD has accepted, a setup/operating link requested by a non-AP MLD may be directly configured. However, for reliable information, the AP MLD may additionally indicate the setup link in the form of a bitmap.

Figure 19:
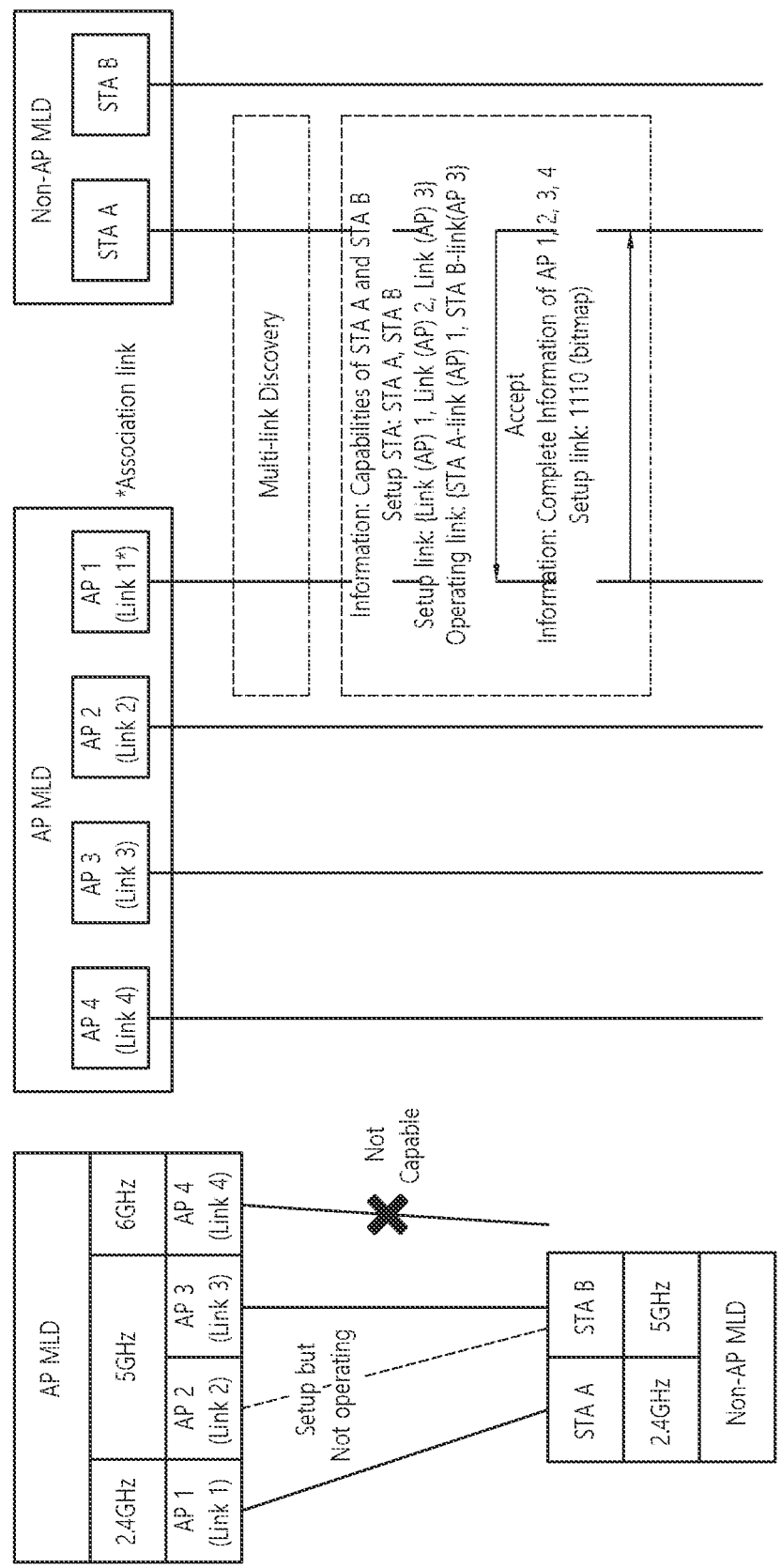
FIG. 19 illustrates an embodiment of the method 1-2.

FIG. 19 illustrates an embodiment of the method 1-2.

Referring to FIG. 19, a bitmap for a setup link may be included. In case of a link bitmap, it is assumed that links from an AP are indicated by default in the order of links 1, 2, 3, and 4. Since it is accepted by an AP MLD, setup is performed for the links 1, 2, and 3, and a bitmap related to the setup link may be 1110. In addition, even if an AP4 is not set up, complete information on all APs, i.e., an AP1, an AP2, an AP3, and an AP4, may be included in the AP MLD. If the AP and the STA are aggregated only in pair to set up one link, i.e., if the AP and the STA are mapped in a 1:1 manner, the AP2 may be excluded in the setup in this example. That is, a bit for the AP2 may be 0. For example, the non-AP MLD may transmit to the AP-MLD an association request frame which requests for setup of the link 1 and link 3, and the AP MLD may transmit an association response frame which accepts the setup of the link 1 and link 3. The association response frame may include complete information of the AP1, AP2, and AP3 operating in the link 1, link 2, and link 3.

2. When Some of the Requested Setup Links are to be Changed

The AP MLD may partially change a setup link and/or an operating link (e.g., link mapping with an STA) requested for ML setup requested by the non-AP MLD. A reason for the changing may include several problems such as a problem of link quality for proper communication, a problem of capability for whether communication is possible, or the like. The partial changing is achieved in the following cases.

When only some of the requested setup links and/or operating links are accepted

When some or all of the requested setup links and/or operating links are accepted, and a response (recommendation) is made additionally for other links Therefore, the AP MLD shall respond according thereto. In particular, this response method may be similar to the case of Accept.

By default, when responding to the ML setup, the AP MLD will provide complete information on each link, and indication information on a setup link and/or operating link may be included. A method for this may include the following method.

2-1. When Only Complete Information is Included Only for Links Accepted for a Setup and/or Operating Link among Requested Links A link/AP in which the information is included is eventually a setup link (AP). However, some of the requested links may not be included.

Figure 20:
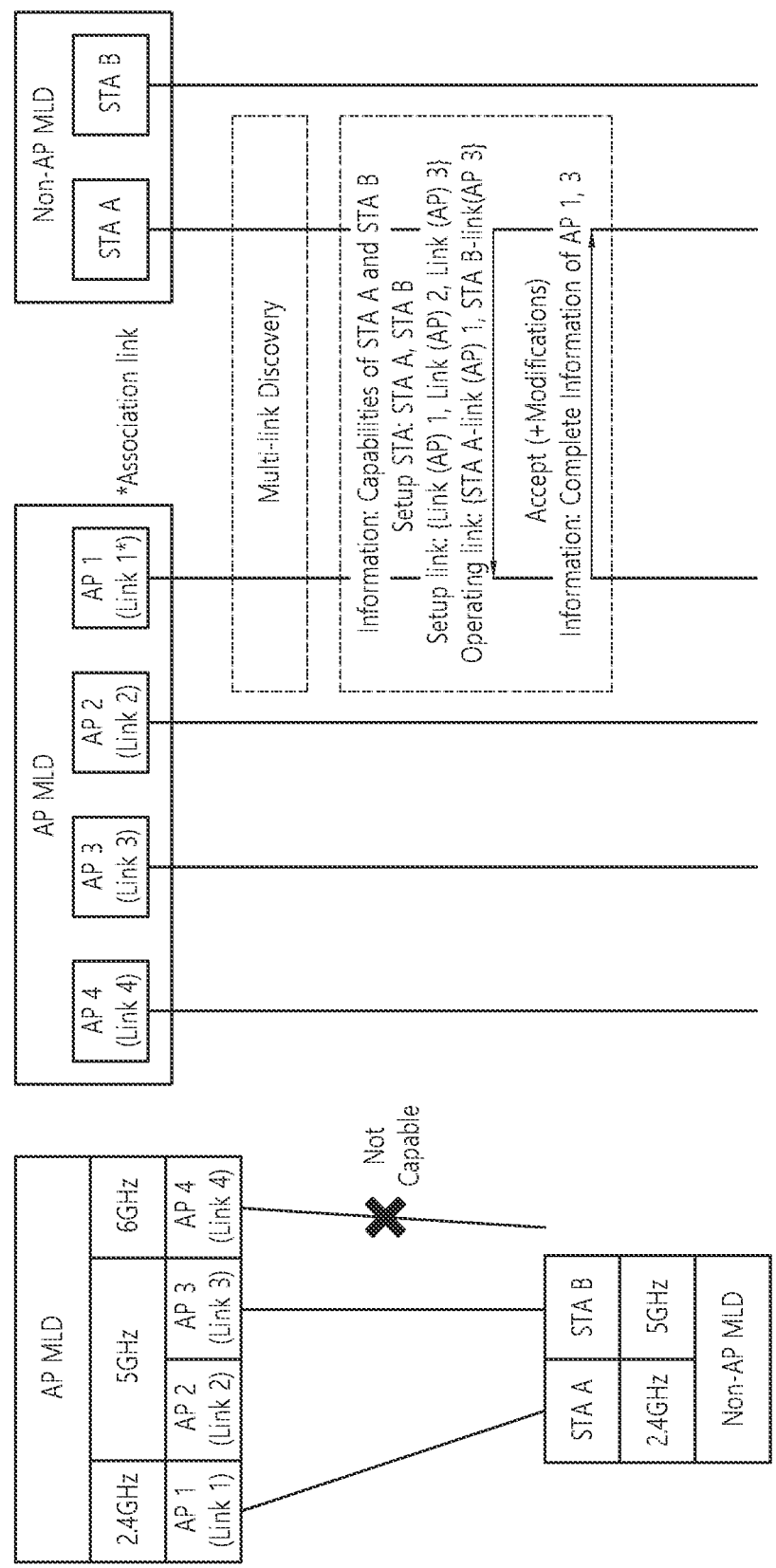
FIG. 20 illustrates an embodiment of the method 2-1.

FIG. 20 illustrates an embodiment of the method 2-1.

Referring to FIG. 20, a non-AP MLD may request for setup of links 1, 2, and 3. An AP1 accepts the request for the link 1 and the link 3, but determines that the link 2 is not appropriate as a setup link and thus makes a response by selecting the APs (links) 1 and 3 as the setup AP (link). Therefore, an accept signal transmitted by the AP MLD may include complete information on the APs (links) 1 and 3 which are the setup APs (links).

In FIG. 20, the number of setup STAs is 2 (i.e., STA A, STA B), and the number of setup links is 3 (link 1, link2, link 3). However, the number of setup STAs may be equal to the number of setup links. For example, the non-AP MLD may request to set up the STA A with the link 1, and to set up the STA B with the link 3. The AP MLD may accept the setup only for the link 1 which is part of the request for the links 1 and 3, and may transmit only complete information of the AP1 operating in the link 1 to the non-AP MLD.

Figure 21:
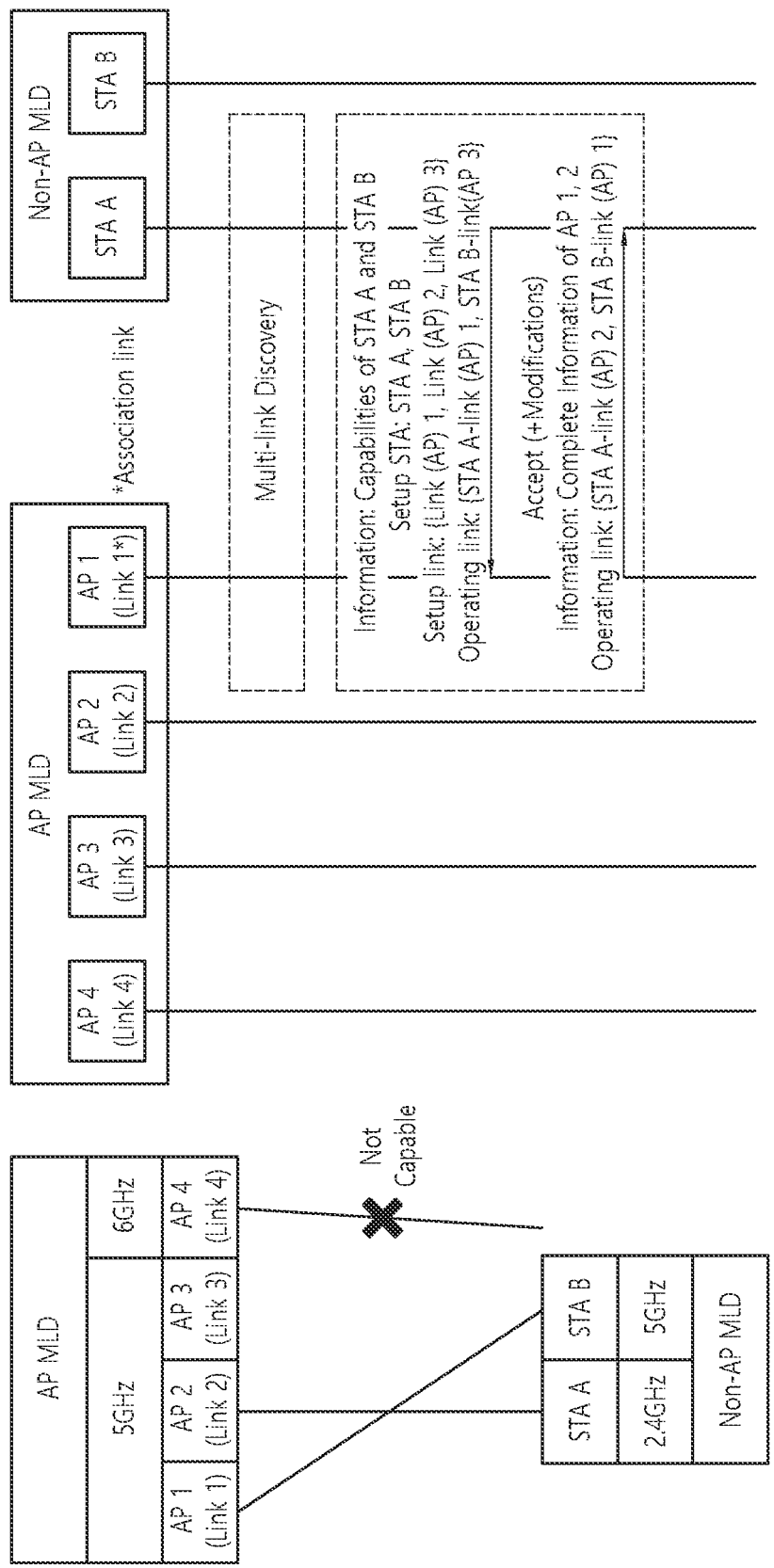
FIG. 21 illustrates an embodiment of the method 2-1.

FIG. 21 illustrates an embodiment of the method 2-1.

Referring to FIG. 21, a non-AP MLD may request for setup of links 1, 2, and 3. An AP 1 accepts the request for the link 1 and the link 2, but determines that the link 3 is not appropriate as a setup link and thus makes a response by selecting the APs (links) 1 and 2 as the setup AP (link). In addition, the link 1 may determine that the STA B is appropriate for operating instead of the STA A and the link 2 may determine that the STA A is appropriate for operating instead of the STA B. Therefore, an accept signal transmitted by the AP MLD may include complete information on the APs (links) 1 and 3 which are the setup APs (links). In addition, the AP MLD may additionally instruct the non-AP MLD such that the STA A operates in the link 2 and the STA B operates in the link 1.

In FIG. 21, the number of setup STAs is 2 (i.e., STA A, STA B), and the number of setup links is 3 (link 1, link2, link 3). However, the number of setup STAs may be equal to the number of setup links. For example, the non-AP MLD may request to set up the STA A with the link 1, and to set up the STA B with the link 3. The AP MLD may accept the setup only for the link 1 which is part of the request for the links 1 and 3, and may determine that it is appropriate that the STA B operates in the link 1 instead of the STA A. The AP MLD may transmit only complete information of the AP1 operating in the link 1 to the non-AP MLD.

2-2. When Complete Information on All Links (APs) is Included

A setup link may be indicated additionally in the form of a bitmap by including complete information on all APs (links) regardless of whether setup is to be performed.

Figure 22:
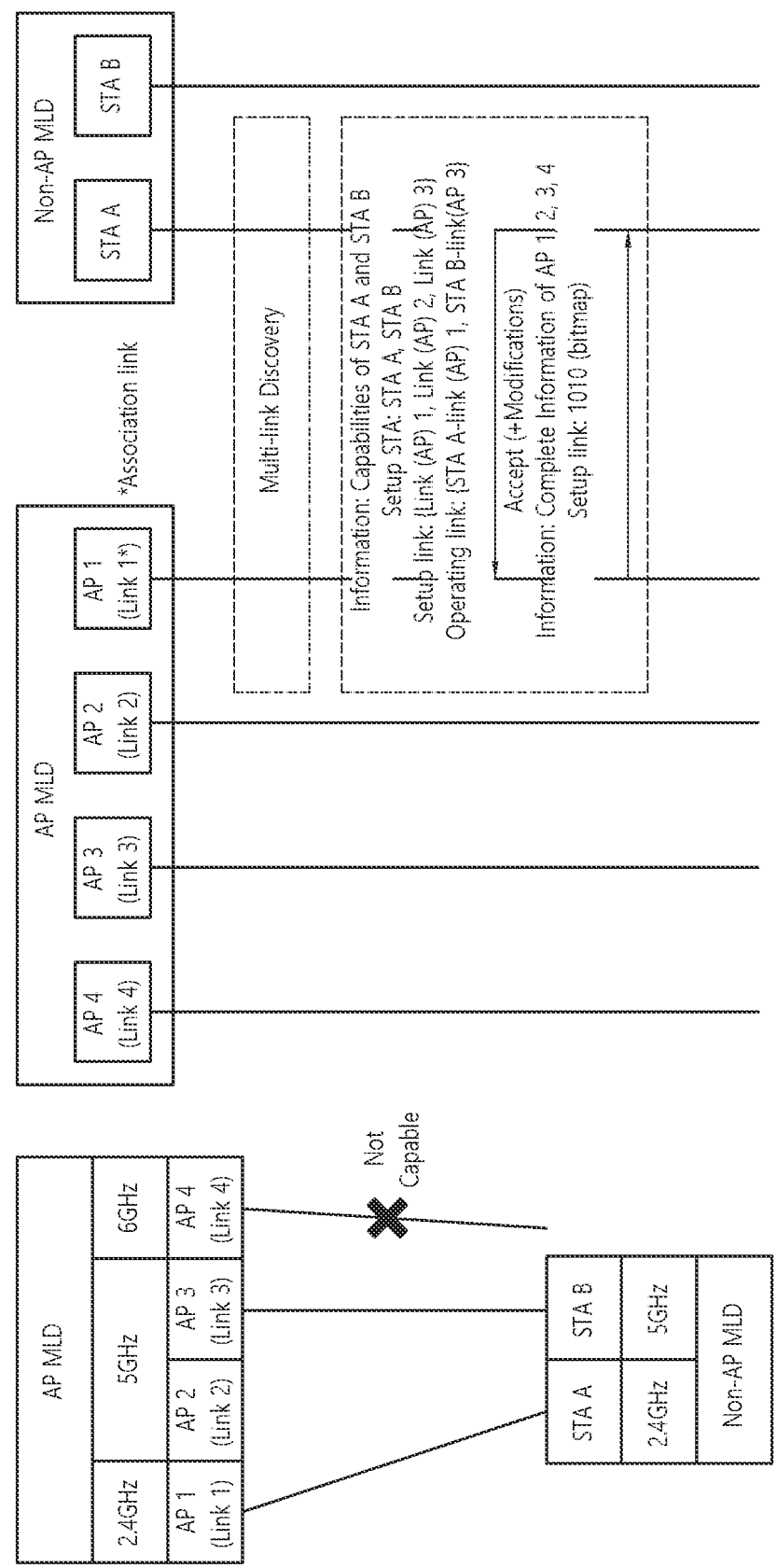
FIG. 22 illustrates an embodiment of the method 2-2.

FIG. 22 illustrates an embodiment of the method 2-2.

Referring to FIG. 22, a non-AP MLD may request for setup of links 1, 2, and 3. An AP1 accepts the request for the link 1 and the link 3, but determines that the link 2 is not appropriate as a setup link and thus makes a response by selecting the APs (links) 1 and 3 as the setup AP (link). An accept signal transmitted by the AP MLD may include information on all APs (links) 1 and 3, and may additionally include bitmap information (e.g., 1010) for the APs (links) 1 and 3 which are the setup APs (links). In case of a link bitmap, it is assumed that links from an AP are indicated by default in the order of links 1, 2, 3, and 4.

Figure 23:
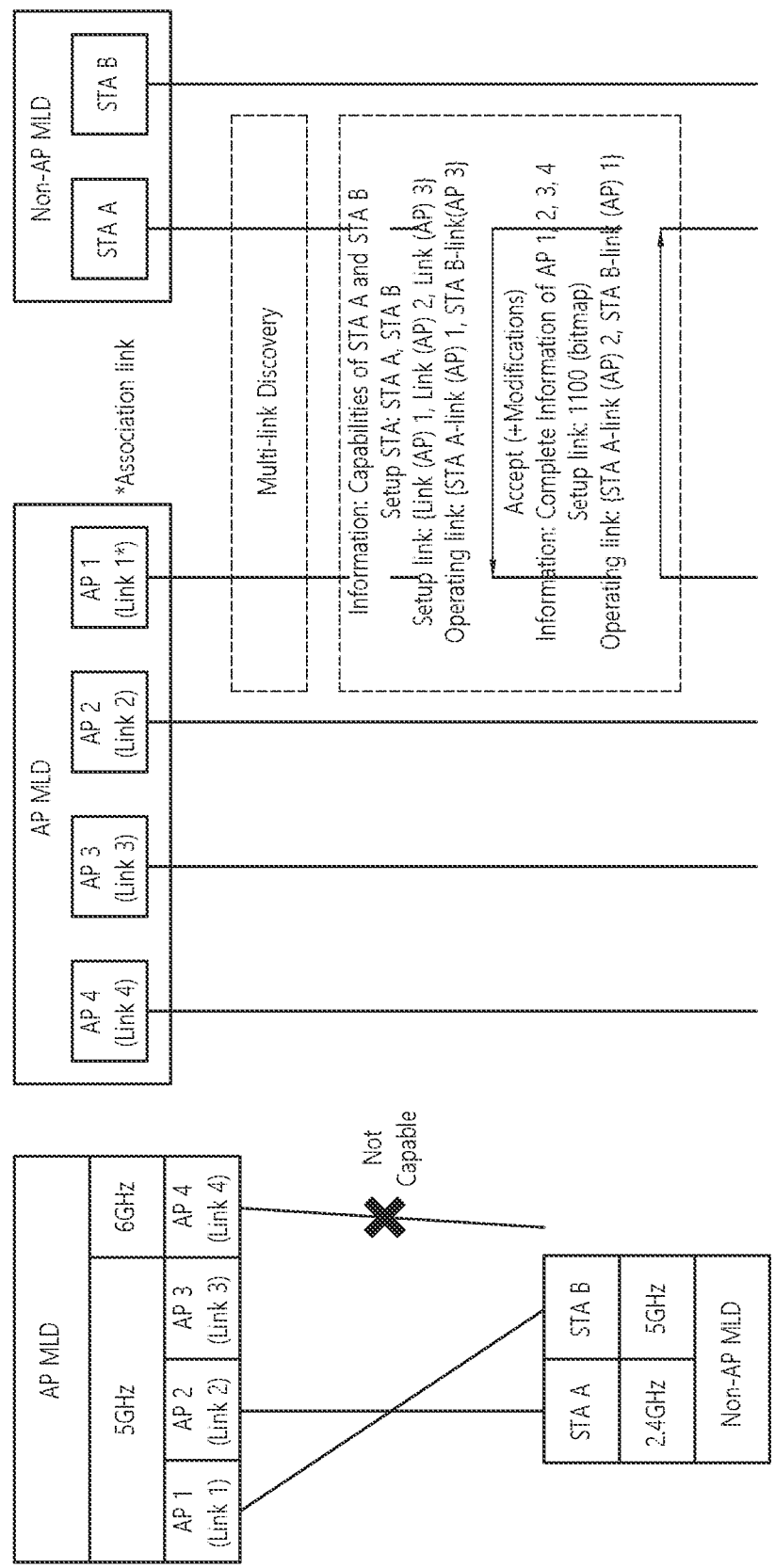
FIG. 23 illustrates an embodiment of the method 2-2.

FIG. 23 illustrates an embodiment of the method 2-2.

Referring to FIG. 23, a non-AP MLD may request for setup of links 1, 2, and 3. An AP 1 accepts the request for the link 1 and the link 2, but determines that the link 3 is not appropriate as a setup link and thus makes a response by selecting the APs (links) 1 and 2 as the setup AP (link). In addition, the link 1 may determine that the STA B is appropriate for operating instead of the STA A and the link 2 may determine that the STA A is appropriate for operating instead of the STA B. Therefore, an accept signal transmitted by the AP MLD may include information on all APs (links), and may additionally include bitmap information (e.g., 1100) for the APs (links) 1 and 2 which are the setup APs (links). In case of a link bitmap, it is assumed that links from an AP are indicated by default in the order of links 1, 2, 3, and 4. In addition, the accept signal may additionally include information indicating that the STA operates in the link 2 and the STA B operates in the link 1.

Figure 24:
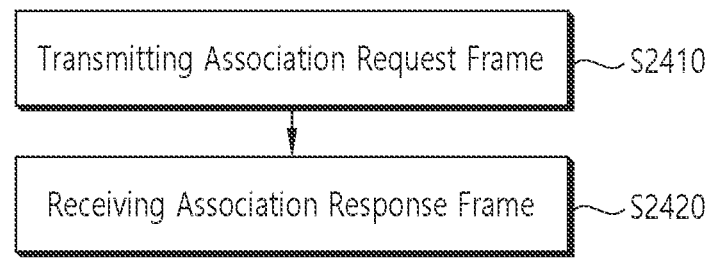
FIG. 24 illustrates an embodiment of a method of operating an STA MLD.

FIG. 24 illustrates an embodiment of a method of operating an STA MLD.

Referring to FIG. 24, the STA MLD may include a first STA and a second STA. The first STA may operate in a first link, and the second STA may operate in a second link.

The STA MLD may transmit an association request frame (S2401). For example, the STA MLD may transmit an association request frame to an access point (AP) MLD. For example, the association request frame may include capability information of a requesting STA which requests for an association with the AP MLD among STAs included in the STA MLD and information related to a request link for which the requesting STAs request for the association.

For example, the capability information of the requesting STA may include complete information including all capabilities of the requesting STA.

For example, the requesting STA which requests for the association with the AP MLD may include the first STA and the second STA. The association response frame may include capability information of a first AP operating in the first link for which the AP MLD accepts the association among the request links.

For example, the information related to the request link may include a link identifier (ID).

For example, the association request frame may be transmitted by the first STA through the first link. For example, information on a link other than the first link among the request links may be included in a multi-link element.

The STA MLD may receive an association response frame (S2420). For example, the STA MLD may receive an association response frame from the AP MLD. For example, the association response frame may include capability information of an AP operating in a link for which the AP MLD accepts the association among the request links.

For example, the capability information of the AP operating in the link for which the AP MLD accepts the association may include complete information including all capabilities of the AP operating in the link for which the AP MLD accepts the association.

For example, the requesting STA which requests for the association with the AP MLD may include the first STA and the second STA. For example, the association response frame may include capability information of first and second APs operating in the first and second links for which the AP MLD accepts the association among the request links.

When the Association Response Frame Includes Only Complete Information on Setup Links (APs)

A link/AP including complete information is eventually a setup link (AP). In addition, since an AP MLD has accepted, an operating link may also be configured as requested by a non-AP MLD.

For example, the non-AP MLD may transmit to the AP-MLD an association request frame which requests for setup of the link 1 and link 3, and the AP MLD may transmit an association response frame which accepts the setup of the link 1 and link 3. The association response frame may include complete information of the AP1 and AP3 operating in the link 1 and link 3.

When Only Complete Information is Included Only for Links Accepted for a Setup and/or Operating Link among Links Requested by the Association Response Frame A link/AP in which the information is included is eventually a setup link (AP). However, some of the requested links may not be included.

The number of setup STAs may be equal to the number of setup links. For example, the non-AP MLD may request to set up the STA A with the link 1, and to set up the STA B with the link 3. The AP MLD may accept the setup only for the link 1 which is part of the request for the links 1 and 3, and may transmit only complete information of the AP1 operating in the link 1 to the non-AP MLD.

For example, the non-AP MLD may request to set up the STA A with the link 1, and to set up the STA B with the link 3. The AP MLD may accept the setup only for the link 1 which is part of the request for the links 1 and 3, and may determine that it is appropriate that the STA B operates in the link 1 instead of the STA A. The AP MLD may transmit only complete information of the AP1 operating in the link 1 to the non-AP MLD.

Figure 25:
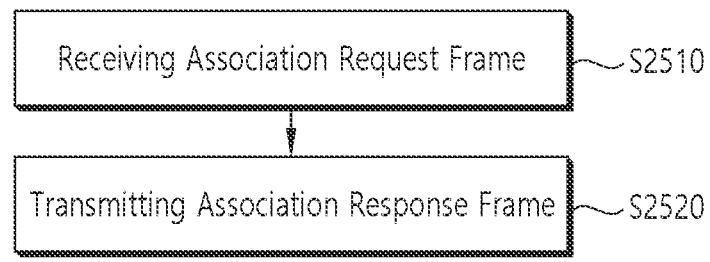
FIG. 25 illustrates an embodiment of a method of operating an access point (AP) MLD.

FIG. 25 illustrates an embodiment of a method of operating an AP MLD.

Referring to FIG. 25, the AP MLD includes a first AP and a second AP. The first AP may operate in a first link, and the second AP may operate in a second link. The STA MLD includes a first STA and a second STA. The first STA may operate in the first link, and the second STA may operate in the second link.

The AP MLD may receive an association request frame (S2510). For example, the AP MLD may receive the association request frame from a station (STA) MLD. For example, the association request frame may include capability information of a requesting STA which requests for an association with the AP MLD among STAs included in the STA MLD and information related to a request link for which the requesting STAs request for the association.

For example, the capability information of the requesting STA may include complete information including all capabilities of the requesting STA.

For example, the requesting STA which requests for the association with the AP MLD may include the first STA and the second STA. The association response frame may include capability information of a first AP operating in the first link for which the AP MLD accepts the association among the request links.

For example, the information related to the request link may include a link identifier (ID).

For example, the association request frame may be transmitted by the first STA through the first link. For example, information on a link other than the first link among the request links may be included in a multi-link element.

The AP MLD may transmit an association response frame (S2520). For example, the AP MLD may transmit the association response frame to the STA MLD. For example, the association response frame may include capability information of an AP operating in a link for which the AP MLD accepts the association among the request links.

For example, the capability information of the AP operating in the link for which the AP MLD accepts the association may include complete information including all capabilities of the AP operating in the link for which the AP MLD accepts the association.

For example, the requesting STA which requests for the association with the AP MLD may include the first STA and the second STA. For example, the association response frame may include capability information of first and second APs operating in the first and second links for which the AP MLD accepts the association among the request links.

Some of detailed steps shown in the example of FIG. 24 and FIG. 25 may not be essential steps and may be omitted. Other steps may be added in addition to the steps shown in FIG. 24 and FIG. 25, and orders of the steps may vary. Some steps the above steps may have independent technical meaning.

The aforementioned technical feature of the present specification may be applied to various apparatuses and methods. For example, the aforementioned technical feature of the present specification may be performed/supported through the apparatus of FIG. 1 and/or FIG. 6. For example, the aforementioned technical feature of the present specification may be applied only to part of FIG. 1 and/or FIG. 6. For example, the aforementioned technical feature of the present specification may be implemented based on the processing chips 114 and 124 of FIG. 1, or may be implemented based on the processors 111 and 121 and memories 112 and 122 of FIG. 1, or may be implemented based on the processor 610 and memory 620 of FIG. 6. For example, the apparatus of the present specification includes: a memory; and a processor operatively connected to the memory. The processor may be adapted to: transmit an association request frame to an AP MLD, wherein the association request frame includes capability information of a requesting STA which requests for an association with the AP MLD among STAs included in the STA MLD and information related to a request link for which the requesting STAs request for the association; and receive an association response frame from the AP MLD, wherein the association response frame includes capability information of an AP operating in a link for which the AP MLD accepts the association among the request links.

The technical feature of the present specification may be implemented based on a computer readable medium (CRM). For example, the CRM proposed by the present specification is at least one computer readable medium having an instruction executed by at least one processor of a station (STA) multi-link device (MLD) of a wireless local area network system (WLAN), wherein the STA MLD includes a first STA and a second STA, the first STA operates in a first link, and the second STA operates in a second link. The instruction may perform an operation including: transmitting an association request frame to an access point (AP) MLD, wherein the association request frame includes capability information of a requesting STA which requests for an association with the AP MLD among STAs included in the STA MLD and information related to a request link for which the requesting STAs request for the association; and receiving an association response frame from the AP MLD, wherein the association response frame includes capability information of an AP operating in a link for which the AP MLD accepts the association among the request links.

Instructions stored in a CRM of the present specification may be executed by at least one processor. The at least one processor related to the CRM of the present specification may be the processors 111 and 121 or processing chips 114 and 124 of FIG. 1 or the processor 610 of FIG. 6. Meanwhile, the CRM of the present specification may be the memories 112 and 122 of FIG. 1 or the memory 620 of FIG. 6 or a separate external memory/storage medium/disk or the like.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims set forth herein may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed in a wireless local area network (WLAN) system, the method comprising:
    transmitting, by a non-access point (non-AP) station (STA) affiliated with a non-AP multi-link device (MLD), an Association Request frame to an AP MLD,
    wherein the Association Request frame includes a link identifier (ID) field identifying at least one link that is requested for setup with the AP MLD, wherein the Association Request frame further includes a 1-bit control field being contiguous to the link ID field,
    wherein a per-STA profile for at least one STA carries one of two types of profiles, wherein the two types of profile are a complete profile and a partial profile,
    wherein to request the at least one link to be setup, the Association Request frame carries the complete profile of a corresponding non-AP STA affiliated with the non-AP MLD,
    wherein the Association Request frame further includes a link mapping field carrying a bitmap related to traffic identifiers (TIDs) being mapped to the at least one link associated with the link ID,
    wherein the Association Request frame further includes information indicating whether a link pair related to the at least one link is a simultaneous transmit and receive (STR) link pair; and
    receiving an Association Response frame from the AP MLD,
    wherein the Association Response frame indicates status information indicating whether the at least one link that is requested for the setup is accepted or not,
    wherein based on the at least one link being accepted, the Association Response frame carries the complete profile of a corresponding AP affiliated with the AP MLD.

2. The method of claim 1, wherein the complete profile is related to capability information of the at least one non-AP STA.

3. The method of claim 1, wherein the Association Request frame further includes an information field set based on a maximum number of simultaneous links supported by-the non-AP MLD.

4. The method of claim 1, wherein the at least one AP is affiliated with the AP MLD.

5. The method of claim 1, wherein the at least one link is configured based on at least one of 2.4 GHZ band, 5 GHz band, and/or 6 GHz band.

6. A non-access point (non-AP) station (STA) configured to operate in a wireless local area network (WLAN) system, the non-AP STA comprising:
    a transceiver transmitting and/or receiving a wireless signal; and
    a processor controlling the transceiver,
    wherein the non-AP STA is affiliated with a non-AP multi-link device (MLD),
    wherein the processor is configured to:
        transmit an Association Request frame an AP MLD,
        wherein the Association Request frame includes a link identifier (ID) field identifying at least one link that is requested for setup with the AP MLD, wherein the Association Request frame further includes a 1-bit control field being contiguous to the link ID field,
        wherein a per-STA profile for at least one STA carries one of two types of profiles, wherein the two types of profile are a complete profile and a partial profile,
        wherein to request the at least one link to be setup, the Association Request frame indicates complete profile of a corresponding non-AP STA affiliated with the non-AP MLD,
        wherein the Association Request frame further includes a link mapping field carrying a bitmap related to traffic identifiers (TIDs) being mapped to the at least one link associated with the link ID,
        wherein the Association Request frame further includes information indicating whether a link pair related to the at least one link is a simultaneous transmit and receive (STR) link pair; and
        receive an Association Response frame from the AP MLD,
        wherein the Association Response frame indicates status information indicating whether the at least one link that is requested for the setup is accepted or not, and
        wherein based on the at least one link being accepted, the Association Response frame includes carries the complete profile of a corresponding AP affiliated with the AP MLD.

7. The non-AP STA of claim 6, wherein the complete profile is related to capability information of the at least one non-AP STA.

8. The non-AP STA of claim 6, wherein the Association Request frame further includes an information field related to a maximum number of links supported by each of the at least one non-AP STA.

9. The non-AP STA of claim 6, wherein the at least one AP is affiliated with the AP MLD.

10. The non-AP STA of claim 6, wherein the at least one link is configured based on at least one of 2.4 GHZ band, 5 GHz band, and/or 6 GHz band.

11. A method performed in a wireless local area network (WLAN) system, the method comprising:
    receiving, by an access point (AP) multi-link device (MLD), an Association Request frame from a non-AP station (STA) affiliated with a non-AP MLD,
    wherein the Association Request frame includes a link identifier (ID) field identifying at least one link that is requested for setup with the AP MLD, wherein the Association Request frame further includes a 1-bit control field being contiguous to the link ID field,
    wherein a per-STA profile for at least one STA carries one of two types of profiles, wherein the two types of profile are a complete profile and a partial profile, wherein to request the at least one link to be setup, the Association Request frame carries the complete profile of a corresponding non-AP STA affiliated with the non-AP MLD, wherein the Association Request frame further includes a link mapping field carrying a bitmap related to traffic identifiers (TIDs) being mapped to the at least one link associated with the link ID, wherein the Association Request frame further includes information indicating whether a link pair related to the at least one link is a simultaneous transmit and receive (STR) link pair; and transmitting, by the AP MLD, an Association Response frame, wherein the Association Response frame indicates status information indicating whether the at least one link that is requested for the setup is accepted or not, wherein based on the at least one link being accepted, the Association Response frame carries the complete profile of a corresponding AP affiliated with the AP MLD.

12. The method of claim 11, wherein the complete profile is related to capability information of the at least one non-AP STA.

13. The method of claim 11, wherein the Association Request frame further includes an information field related to a maximum number of links supported by each of the at least one non-AP STA.

14. The method of claim 11, wherein the at least one AP is affiliated with the AP MLD.

15. The method of claim 11, wherein the at least one link is configured based on at least one of 2.4 GHZ band, 5 GHz band, and/or 6 GHz band.

* * * * *